US012650681B2

(12) United States Patent
Fitzgerald et al.

(10) Patent No.: US 12,650,681 B2
(45) Date of Patent: Jun. 9, 2026

(54) CLOUD-BASED DATA RECORDER AND EVENT PROCESSOR

(71) Applicant: Anderson Instrument Company Inc., Fultonville, NY (US)

(72) Inventors: Ryan Fitzgerald, Albany, NY (US); Johannes Wanner, Engishausen (DE); Alex Kontschev, Erkheim (DE); Paul Wagner, Sunbury, OH (US); Richard Bond, Pattersonville, NY (US); Ashish Maharjan, Midland, TX (US); Harvinder Singh, Bengaluru (IN)

(73) Assignee: Anderson Merger LLC, Fultonville, NY (US)

( * ) Notice: Subject to any disclaimer, the term of this patent is extended or adjusted under 35 U.S.C. 154(b) by 280 days.

(21) Appl. No.: 17/530,277

(22) Filed: Nov. 18, 2021

(65) Prior Publication Data

US 2023/0031089 A1     Feb. 2, 2023

Related U.S. Application Data

(60) Provisional application No. 63/228,074, filed on Jul. 31, 2021.

(51) Int. Cl.
G05B 19/418          (2006.01)

(52) U.S. Cl.
CPC ..... G05B 19/4183 (2013.01); G05B 19/4185 (2013.01)

(58) Field of Classification Search
CPC ..................... G05B 19/4185; G05B 19/4183
See application file for complete search history.

(56) References Cited

U.S. PATENT DOCUMENTS

| | | | |
|---|---|---|---|
| 4,416,194 A | 11/1983 | Kemp | |
| 5,290,583 A | 3/1994 | Reznik et al. | |
| 5,389,335 A | 2/1995 | Charm et al. | |
| 5,607,613 A | 3/1997 | Reznik | |
| 5,846,583 A | 12/1998 | Gentner | |
| 6,086,932 A | 7/2000 | Gupta | |
| 6,410,066 B1 | 6/2002 | Weng | |
| 6,579,494 B1 | 6/2003 | Chevallet et al. | |
| 7,644,654 B2 | 1/2010 | Nielsen et al. | |
| 8,178,142 B2 | 5/2012 | Greiner et al. | |
| 10,452,679 B2 * | 10/2019 | Otaguro ............... | G06F 16/252 |
| 2002/0073652 A1 | 6/2002 | Wiedemann | |
| 2003/0049356 A1 | 3/2003 | Nielsen et al. | |
| 2004/0006486 A1 | 1/2004 | Schmidt et al. | |
| 2004/0016892 A1 | 1/2004 | McIntyre et al. | |

(Continued)

*Primary Examiner* — Charles Rones
*Assistant Examiner* — Ken Hoang
(74) *Attorney, Agent, or Firm* — Jordan IP Law, LLC

(57) ABSTRACT

A data recording and annotation system includes data recording device for generating a data record. After the data recording device receives a request to review the one or more data records, the data recorder provides the one or more data records to the requester. After the data recorder receives an approval or annotation made about the data record, the data recorder generates a revised data record including information from the data record and from the approval or annotation. Then the revised data record is stored on the data recording device. The data records may be accessed at either the data generating device itself, or through a remote connection.

19 Claims, 16 Drawing Sheets

(56)            References Cited

U.S. PATENT DOCUMENTS

| | | | |
|---|---|---|---|
| 2004/0066314 | A1 | 4/2004 | Souza et al. |
| 2004/0185156 | A1 | 9/2004 | Garwood |
| 2005/0103213 | A1 | 5/2005 | Dumm |
| 2005/0112258 | A1 | 5/2005 | Feldmeier |
| 2006/0040029 | A1 | 2/2006 | Gunawardena et al. |
| 2008/0274240 | A1 | 11/2008 | Germouni et al. |
| 2009/0319482 | A1* | 12/2009 | Norlander ............... G06F 16/78 |
| 2010/0063613 | A1 | 3/2010 | Popp |
| 2010/0088528 | A1* | 4/2010 | Sion ...................... G06F 16/125 |
| | | | 713/193 |
| 2011/0290739 | A1 | 12/2011 | Bowen |
| 2012/0118799 | A1 | 5/2012 | Bowen |
| 2012/0266864 | A1 | 10/2012 | Wright |
| 2014/0159914 | A1 | 6/2014 | Heller |
| 2014/0278202 | A1 | 9/2014 | Anderson |
| 2015/0010679 | A1 | 1/2015 | Strong et al. |
| 2016/0114260 | A1 | 4/2016 | Frick |
| 2016/0350715 | A1 | 12/2016 | Minvielle |
| 2018/0156768 | A1 | 6/2018 | Bose-Mullick et al. |
| 2020/0111041 | A1* | 4/2020 | Levine ............. G06Q 10/06316 |
| 2020/0118058 | A1* | 4/2020 | Larsen ............... G06Q 10/0633 |
| 2021/0010986 | A1* | 1/2021 | Bose-Mullick ......... G01F 1/688 |
| 2021/0397522 | A1* | 12/2021 | Owen ................... G06F 16/128 |
| 2022/0229700 | A1* | 7/2022 | Goebel ................... H04L 63/04 |
| 2022/0277107 | A1* | 9/2022 | Beekman ............ G06F 21/6281 |

* cited by examiner

CLOUD-BASED DATA RECORDER AND EVENT PROCESSOR

CROSS REFERENCE TO RELATED APPLICATIONS

This application is a non-provisional of and claims benefit from U.S. Provisional Patent Application 63/228,074, filed Jul. 31, 2021 and entitled CLOUD-BASED DATA RECORDER AND EVENT PROCESSOR, the contents of which are incorporated by reference herein in their entirety. This application is related to U.S. patent application Ser. No. 17/037,448, filed Sep. 29, 2020, entitled CONTROL FOR PASTEURIZATION PROCESS, U.S. patent application Ser. No. 15/834,571, filed Dec. 7, 2017, entitled CONTROL FOR PASTEURIZATION PROCESS, and U.S. Provisional Patent Application 62/430,940, filed Dec. 7, 2016, entitled SYSTEM AND METHODS FOR A PAPERLESS RECORDING CONTROL SYSTEM, the contents of all of which are incorporated by reference herein in their entirety.

FIELD OF THE INVENTION

This disclosure is directed to a data recorder, and to a system for remote access, annotation, and approval to data from the data recorder in a tamper-proof and secure manner.

BACKGROUND

Many industrial processes involve recording data generated from sensors that are used to monitor various aspects of the production. Common sensors include thermometers, flow rate meters, pressure sensors, gas sensors, pH meters, voltmeters and other sensors to measure electrical signals, etc. These sensors monitor various processes as products are being produced. The food and beverage industry makes much use of sensor data records, as many different types of products require the manufacturer to produce safety records for food that is produced and sold to consumers.

One such process that heavily relies on data recorded from sensors is a pasteurization process. Although embodiments of the invention are not limited to pasteurization processes, description of such a process works well to describe the problems in industry as well as the solution embodiments of the invention provide. During a pasteurization process, a product is heated for a sufficient amount of time and at a sufficient temperature to kill all or substantially all of the microorganisms present in or on the product. The Food and Drug Administration (FDA) and other regulating entities have established standards for the pasteurization of specific products, such as for dairy products. These standards include the recommended minimum temperature to which the product should be heated, and the recommend minimum time during which the product should be at or above the minimum temperature. If a product is not heated for a sufficient amount of time and/or at a sufficient temperature, serious consequences can result. The survival of microorganisms intended to be killed in the pasteurization process can create a health risk for the consumer and/or an economic loss for the producer, both of which should be avoided.

In a typical known pasteurization system, temperature and flow rate of the heated food substance are measured by a thermometer device and flow metering device and that data is recorded by a circular chart recorder. The system includes a singular, fixed set point for each of the temperature and the flow rate to determine whether the food substance is adequately pasteurized, which is recorded by the respective data record. Much of existing pasteurization systems are physical-based recording systems, meaning that data is physically recorded on paper, such as a paper disk, by a pen that is dragged across the paper. Such mechanical systems include moving parts that can wear, break, and may fall out of adjustment, such as print arms, motors, and print cartridges, for instance. Maintaining a physical paper record of pasteurization events includes another set of problems with potential for damage by water, fire, insects, rodents, as well as the requirement of secure, physical, space for storage. Further, reviewing the recorded data is limited to inspecting the paper record, which requires physical presence at the recording device.

Embodiments of the disclosure address these and other deficiencies in the prior art.

BRIEF DESCRIPTION OF THE DRAWINGS

Aspects, features and advantages of embodiments of the present disclosure will become apparent from the following description of embodiments in reference to the appended drawings in which.

DETAILED DESCRIPTION

Figure 1:
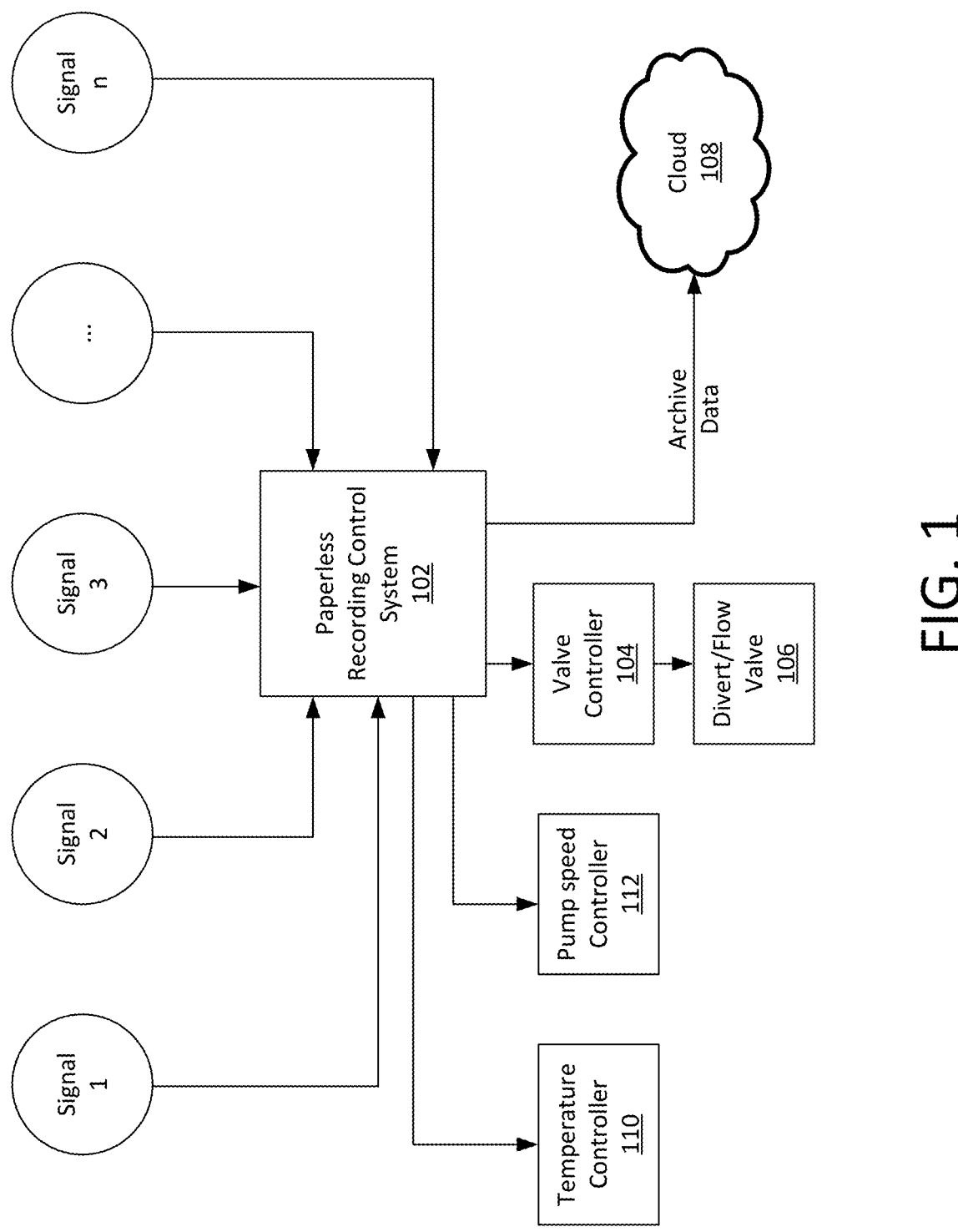
FIG. 1 is a block diagram of a paperless recording control system according to embodiments of the disclosure.

FIG. 1 depicts a control environment in accordance with various embodiments of the present disclosure. As depicted, the control environment includes a paperless recording control system 102. Paperless recording control system 102 can be configured to take as input, or receive, any number of signals, represented here as signals 1-n. In embodiments, these signals can be received from any suitable source, such as, for example, one or more sensor assemblies. Such sensor assemblies can include, but are not limited to, temperature sensors, flow sensors, pressure sensors, turbidity level sensors, a digital reference thermometer (such as the DART thermometer available from Anderson Instrument Co. Inc. of Fultonville, N.Y. 12072), or any other analytical sensor. In a particular embodiment, the sensors can include any sensors utilized in a pasteurization process.

The paperless recording control system 102 can be configured to process these signals to control a process, or aspects or sub-processes thereof, such as, for example, a pasteurization process. In embodiments, this control could be in accordance with established control systems methodologies, such as, for example, proportional-integral-derivative (PID) control methodology or any similar control algorithm. In such embodiments, paperless recording control system can be configured to output signals to the control mechanisms associated with the above described sensors, such as, for example, thermal control mechanisms, flow control mechanisms, pressure control mechanisms, etc. Examples of processes that may be controlled and recorded by the paperless recording control system 102 can include High-Temperature, Short-Time (HTST) pasteurization, Higher-Heat, Shorter-Time (HHST) pasteurization, or Ultra-High Temperature (UHT) pasteurization, for example. The FDA specifies the range of acceptable process conditions for such pasteurization processes. A dairy or other food product processing plant may include multiple pasteurization systems. Each system may be controlled by a separate controller and have its own data recorder, typically configured as a Safety Thermal Limit Recorder (STLR), although some data recorders may be configured as a Safety Flow Limit Recorder (SFLR). The control set points for each system may be adjusted independently for proper pasteurization of the particular type of product processed at any given time, such as skim milk, whole milk, yogurt, eggs, etc.

In addition to controlling such a process, or sub-process, the paperless recording control system 102 can, in some embodiments, also be configured to determine a point at which the prescribed process, or sub-process, has been successfully accomplished (e.g., when a product could legally be considered to have been pasteurized). In, such embodiments, the paperless recording control system 102 can be configured to output a signal indicating that the process has completed successfully. Such a signal could be, for example, a valve control signal that is configured to cause a valve of a pasteurization process to open to allow product undergoing pasteurization to exit the pasteurization process (e.g., to enter a holding tank). Such a signal is depicted by the arrow exiting the paperless recording control system 102 and entering valve controller 104. In the depicted embodiment, valve controller 104 can receive the signal and, in response cause a divert/flow valve 106 of the pasteurization process to open, thus allowing pasteurized product to exit the pasteurization process. In embodiments, this signal can be a low voltage DC signal (e.g., 40 volts). Other output signals may include a temperature control signal this is configured to cause a pasteurization tube to be heated to a particular system and a pump-speed control signal that is configured to control the speed of a pump to pump a food substance through the pasteurization process.

Paperless recording control system 102 can also be configured to record values of the incoming signals for data recording and display purposes. Such data recording purposes could include, for example, data sufficient to validate that a pasteurization process was successfully completed. Data may be sampled from real-time sensors and recorded periodically, such as at regular time intervals. Such intervals may be measured in minutes, tens of minutes, or hours. Data may also be sampled based on certain triggering events, such as storing times when particular portions of the system exceed or fall below certain temperature thresholds or pressures.

In embodiments, paperless recording control system 102 could have a local archive of these recorded values which can be verified via a human machine interface (HMI), such as a touchscreen, provided by the paperless recording control system 102. In embodiments, the local archive can include sufficient storage to preserve two years of data produced and/or received by the paperless recording control system. In addition to the local archive, the paperless recording control system 102 can also be connected with one or more external repositories, such as, for example cloud 108. As used herein, cloud 108 can represent and include any number of servers, including fractional server usage associated with, for example, a data center. Archiving can be performed periodically (every day, as space is need in the local archive, etc.) or on demand (e.g., based on input from a user of the paperless recording control system 102. In addition to, or in place of, cloud 108, paperless recording control system can also include removable media (e.g., a memory card, thumb drive, etc.) that can be removed for archival purposes. In such embodiments, the local archive of the paperless recording control system 102 can include a redundant copy of the data that is included on the memory card or thumb drive. In addition, the data can be encrypted in any number of ways to prevent tampering with the data. One such mechanism could include encryption of the data via a trusted platform module (TPM), or similar mechanism, of the paperless recording control system 102 such that the data is effectively sealed to the paperless recording control system 102. It will be appreciated that encryption via a TPM is just one possible mechanism for encrypting the data to prevent tampering of the data and any encryption mechanism (e.g., public/private key encryption) can be utilized to enable viewing the data without providing the ability to modify the data to maintain data integrity. Additional aspects of the paperless recording control system 102 will be readily apparent throughout the disclosure provided for herein.

Figure 2:
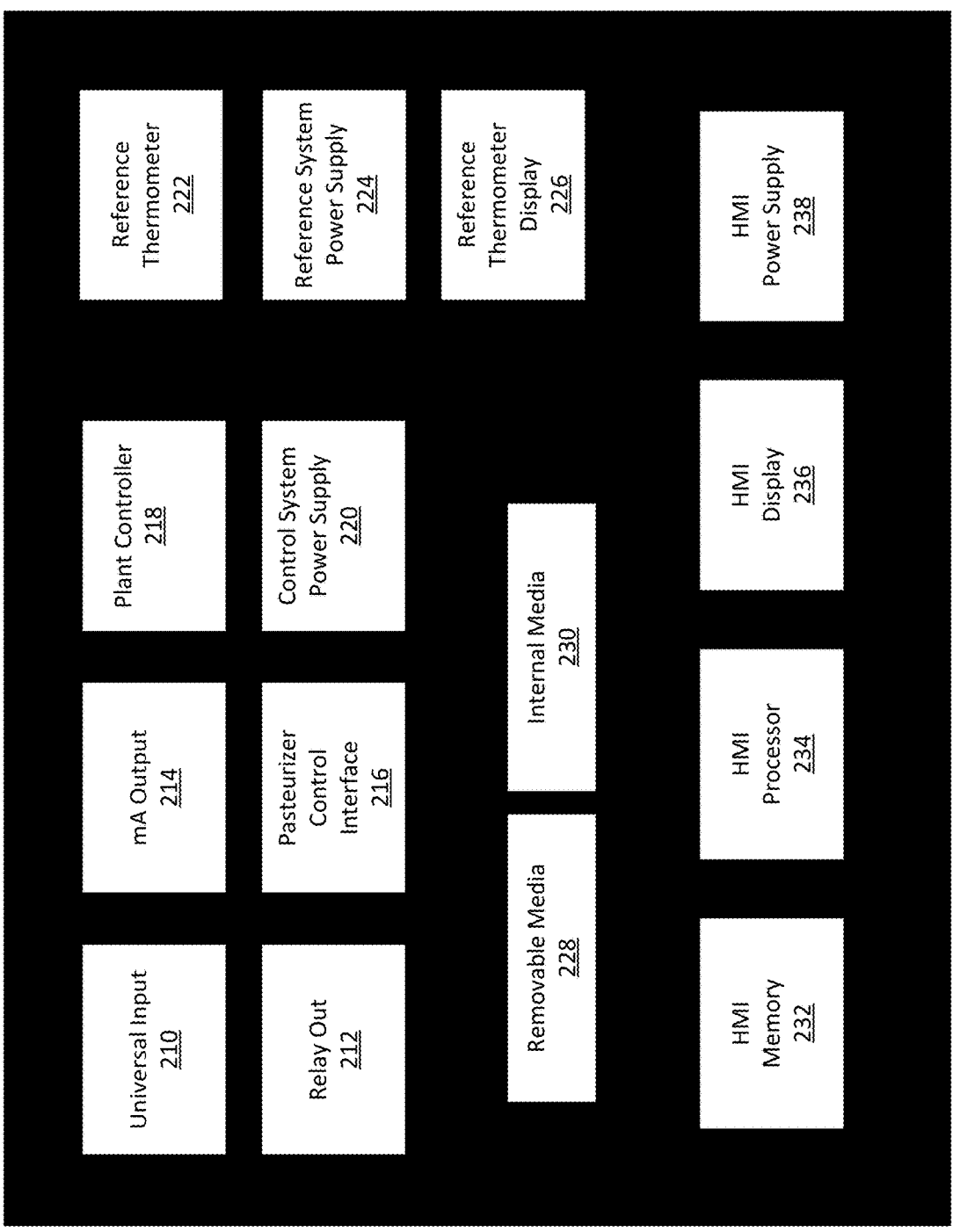
FIG. 2 is a more detailed block diagram of the paperless recording control system of FIG. 1.

FIG. 2 depicts a more detailed view of portions of the paperless recording control system 102 of FIG. 1. As depicted, the paperless recording control system 102 can include a control system 202, a reference system 204, storage 206, and an HMI system 208. Each of these systems will be discussed in turn.

Control system 202 includes a number of illustrative components. As depicted, control system 202 includes a universal input 210, a relay out 212, a milliamp (mA) output 214, a pasteurizer control interface 216, and a control system power supply 220. Universal input 210 represents a component that can be utilized to receive one or more signals such as those described in detail in reference to FIG. 1 (e.g., signals 1-n depicted in FIG. 1, or any other signals described herein). In embodiments, any number of universal inputs 210 can be included within control system 202 to receive any number of signals. The number of universal inputs 210 could be dictated, for example, by the particular application of paperless recording control system 102.

Relay out 212 can be configured to operate in a similar manner to any other relay component currently utilized. The mA output 214 component represents a component configured to provide a measurement signal based on a measurement of an associated signal (e.g., any of signals 1-n of FIG. 1) where an adjustment in current output by mA output 214 reflects an adjustment in the measurement of the associated signal. In embodiments, the measurement signal can range from 4 to 20 mA where any measurement of the associated signal maps to a specific current output by mA output 214. An example of such a component is depicted below.

The pasteurizer control interface (PCI) 216 represents a component that outputs one or more control signals that are configured to control aspects of a pasteurization process. Such signals could include, for example, the signal provided to valve controller 104 of FIG. 1, discussed above.

The plant controller 218 represents a master controller of control system 202. As such plant controller 218 can power cycle any of the other depicted components. In addition, plant controller 218 can take the values of the input signals and can carry out proportional-integral-derivative (PID) control system processes, or other similar control processes, to manage the process being carried out by the paperless recording control system.

It will be appreciated that the depicted components merely represent an illustrative configuration of control system 202 and that more or fewer components can be included without departing from the scope of this disclosure. For example, as mentioned previously, an encryption component, such as a hardware encryption component (e.g., TPM), could also be included to encrypt data being output by the control system 202 in order to maintain integrity of the data. In addition, each of these components can be implemented in any number of ways, such as, for example, via hardware, software, or any combination thereof. In some embodiments, control system 202 could be implemented via the backplane configuration discussed in detail below. It should be appreciated though, that the backplane configuration discussed herein is merely one possible configuration that can be utilized to implement the functionality provided by control system 202.

It should be appreciated that, in embodiments, control system 202 may need to be fully functional while the associated process is being carried out (e.g., a pasteurization process). In such embodiments, control system 202 represents a hard real-time system where any missed responses (e.g., deadlines) represent total system failure. In such embodiments, it can be desirable to isolate HMI system 208 and control system 202 (as depicted). This can enable the HMI functionality of HMI system 208 to be dissociated from the control and data gathering functionality of control system 202. By dissociating HMI system 208 from control system 202, a failure with the HMI system 208 will not impact the functionality of control system 202, thereby enabling continued recording of data and control of the associated process, even when the HMI system has encountered an issue.

Paperless recording control system also includes a reference system 204. Reference system 204 can include, for example, a reference thermometer (e.g., the previously mentioned DART thermometer) that is configured to measure a current temperature, a reference system power supply 224 that is configured to provide an independent source of power to the reference system 204, and a reference thermometer display 226 that can be configured to display a measurement of the reference thermometer to a user of the paperless recording control system 102. While depicted as a reference thermometer, it will be appreciated that any other reference sensors could be utilized without departing from the scope of this disclosure.

As depicted, reference system 204 can be completely isolated and independent from the other functionality of paperless recording control system 102. This isolation can maintain the integrity of reference system 204. In other embodiments, the reference system 204 can be external to the paperless recording control system 102. In either of these embodiments, reference system 204 can be configured to output a reference signal that indicates a present measurement of the reference system 204.

Paperless recording control system 102 also includes storage 206. Storage 206 can include removable media (e.g., a thumb-drive, secure digital (SD) card, etc.) as well as internal media 230 that can be utilized to store a local archive of data. In embodiments, storage 206 can be written to by control system 202 and can be accessed by HMI system 208. In some embodiments, storage 206 could be integrated with HMI system 208. HMI system 208 is discussed in greater detail below. In embodiments, the removable media 228 can be removed by an operator to be copied to an external archive. In such embodiments, upon re-inserting removable media 228, removable media can be updated with any new data that has been stored on internal media 230. In some embodiments, to ensure the integrity of the data on removable media 228, the internal archive of internal media 230 can be copied over anything already stored on removable media 228, to ensure an exact copy of the local archive is also stored on removable media 228. As discussed previously, the data stored on removable media 228 and internal media 230 can be encrypted. In some embodiments, internal media 230 can have sufficient capacity to store a great deal of data (e.g., 2 years of operating data) in the local archive.

Finally, paperless recording control system 102 includes an HMI system 208. As depicted, HMI system 208 is completely isolated from both the control system 202 and the reference system 204. As such, HMI System 208 includes independent HMI memory 232, an independent HMI processor 234, an independent HMI display 236 (e.g., a touchscreen), and an independent HMI power supply 238. In embodiments, HMI memory 232 can include software, which, when executed by HMI processor 234, causes the HMI system to carry out any of the HMI processes described and/or depicted herein. In some embodiments, HMI system can also include an embedded web service (EWS) to enable remote access to the paperless recording control system 102. Such remote access can enable a user to remotely adjust configuration parameters, such as those discussed in detail below, or to view any of the screens depicted herein. In some embodiments, the EWS can take the place of HMI display 236, or can be implemented in conjunction with HMI display 236.

As an element of particular sub-systems operating independently from one another, the various systems depicted in FIG. 2 may store data from each of these disparate systems separately, so that the data related to the food processing, such as pasteurization, is stored separately from any data related to the general operation of the paperless recording system 102, such as the HMI system 208. In more detail, data from the reference system 204 as well as the control system 202 may be stored in separate memory or in separate memory locations from the data related to the HMI system 208. Data from the reference system 204 and control system 202 may be referred to as 'legal' data, since government entities typically require data collected in the pasteurization process to be stored and maintained for a period of time so that any public illness outbreak that may occur may be traced back to its source. Further, storing this legal data in a location separate from general data allows any oversight agency to be able to more easily review the pasteurization history of any product to ensure compliance with safety regulations than had the legal data been comingled with general operation data.

Further, in some embodiments, the paperless recording control system 102 may even prevent editing or modification of any data collected through the reference system 204 and control system 202. This locking of legal data provides the government entities as well as the public peach of mind in knowing that, once recorded, the pasteurization data may not be modified or changed by anyone. Particular examples of methods of separating and locking of the legal data are set forth below.

Figure 3:
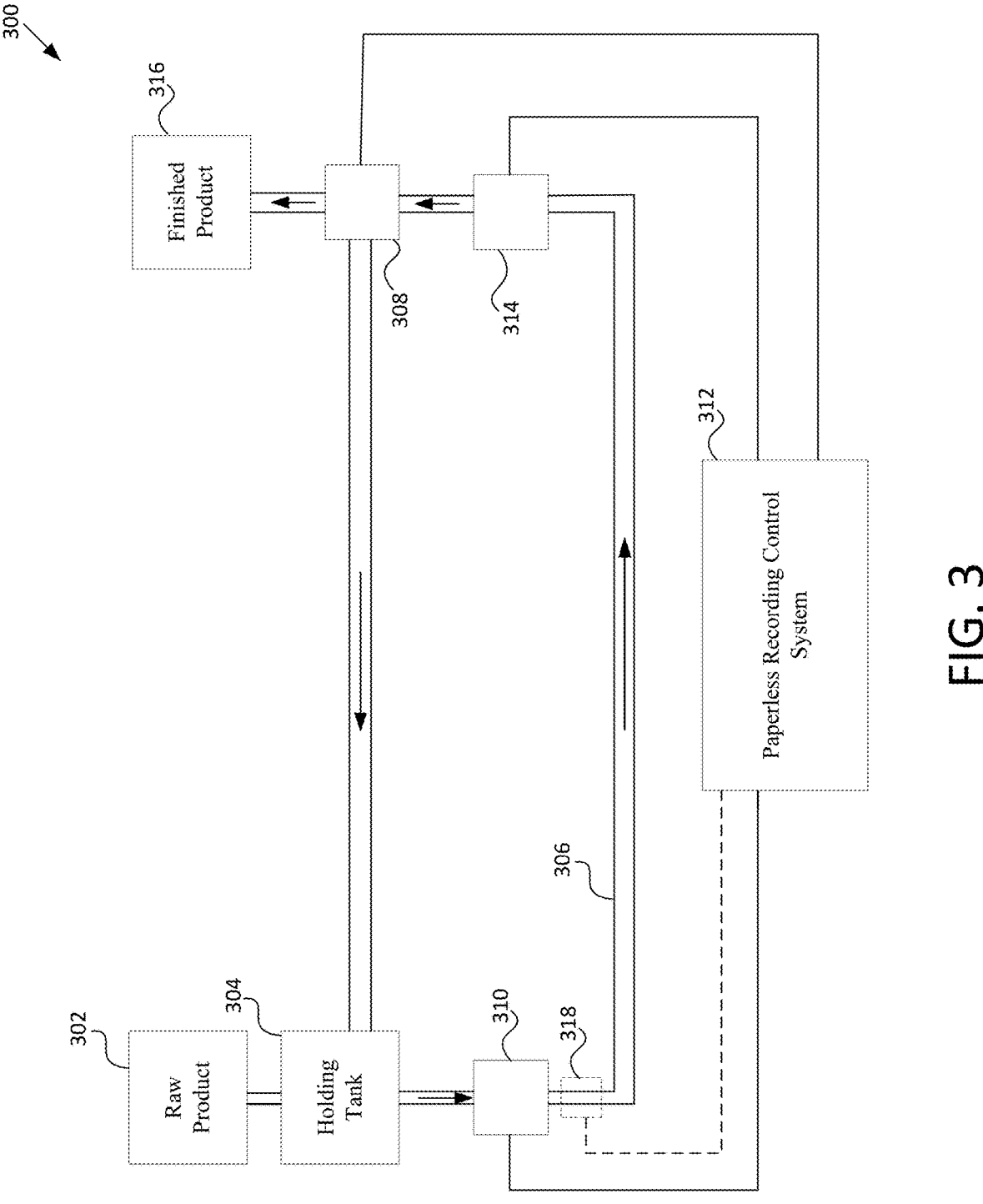
FIG. 3 is an example of a block diagram depicting the paperless recording control system of FIG. 1 in a pasteurization system.

FIG. 3 depicts an example block diagram of a simplified pasteurization system 300 including the paperless recording control system of FIG. 1, according to some embodiments of the disclosure. This figure illustrates an example of the data the paperless recording control system 102 may collect, and how the paperless recording control system may control processes to manage a pasteurization process. The pasteurization system 300 of FIG. 3 may include additional components, not shown, such as heat exchangers, homogenizers, pressure switches, etc., as would be understood by one skilled in the art.

A food substance that is unpasteurized and held in a raw product tank 302 flows into a holding tank 304 prior to pasteurization. The food substance flows through a pasteurization tube 306, which may also be referred to as piping, to a valve 308. While in the pasteurization tube 306, the food substance is heated by a heating element (not shown). A flow sensor 310 measures the flow of the food substance as it enters or proximate to the entry of the pasteurization tube 306. An output from the flow sensor 310 is sent through either wireless or wired communication to a paperless recording control system 312, which may be a paperless recording control system 102, as discussed in detail above. A temperature sensor 314 measures the temperature of the food substance at or near an end of the pasteurization tube 306 and sends the measured temperature through wires or wirelessly to the paperless recording control system 312. Although not depicted in FIG. 3, the pasteurization system may have many flow sensors 310 and/or temperature sensors 314. That is, the paperless recording control system 312 may receive multiple flow rates or temperatures of the food substance throughout the process of pasteurization to confirm that food is adequately pasteurized and/or the quality of the food.

In some embodiments, an optional second temperature sensor 318 may be included at the beginning or proximal portion of the pasteurization tube 306. The output of the second temperature sensor 318 is sent to the paperless recording control system 312 and may be used by the paperless recording control system 312 to predetermine a likelihood that a temperature taken by the temperature sensor 314 will indicate that the food substance is pasteurized or may be used for other determinations and calculations by the paperless recording control system 312.

The paperless recording control system 312 determines whether the food substance has been pasteurized based on a combination of both the flow rate of the food substance and the temperature of the food substance. If the food substance is pasteurized, the valve 308 directs the food substance to a finished product tank 316. If the paperless recording control system 312 determines that the food substance has not been pasteurized or if there is any other error, the paperless recording control system 312 sends a signal to the valve 308 to direct the food substance back to the holding tank 304 to flow through the pasteurization system 300 again.

In some embodiments, a user may enter a food substance type within the HMI of the paperless recording control system 312. The paperless recording control system 312 includes a memory that has a database indicating a variety of food substances, such as milk, yogurt, egg mixtures, etc., that a user may select through the HMI of the paperless recording control system 312. Once selected, the paperless recording control system 312 determines the acceptable temperature threshold based on both the flow rate of the food substance as well as the type of food substance. That is, the memory may include a formula for each food substance type saved to calculate the acceptable threshold temperature based on the length of the pasteurization tube 306 and the flow rate of the food substance or the memory may include a look-up table for each of the food substance types to even more quickly determine the acceptable threshold temperature for the flow rate of that food substance.

Figure 4:
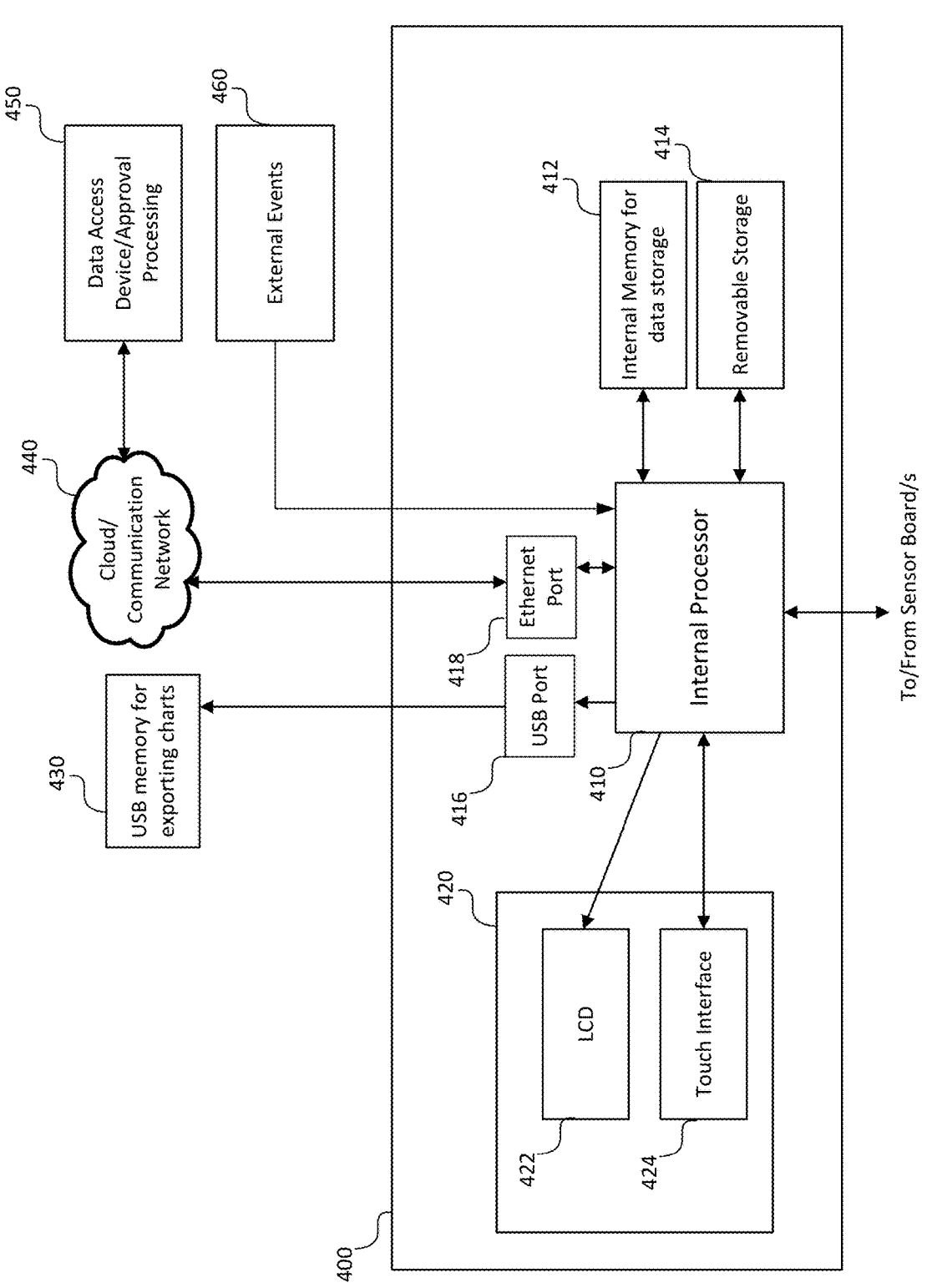
FIG. 4 is an example block diagram of an embodiment of components of a paperless recording control system according to embodiments of the invention.
Figure 5:
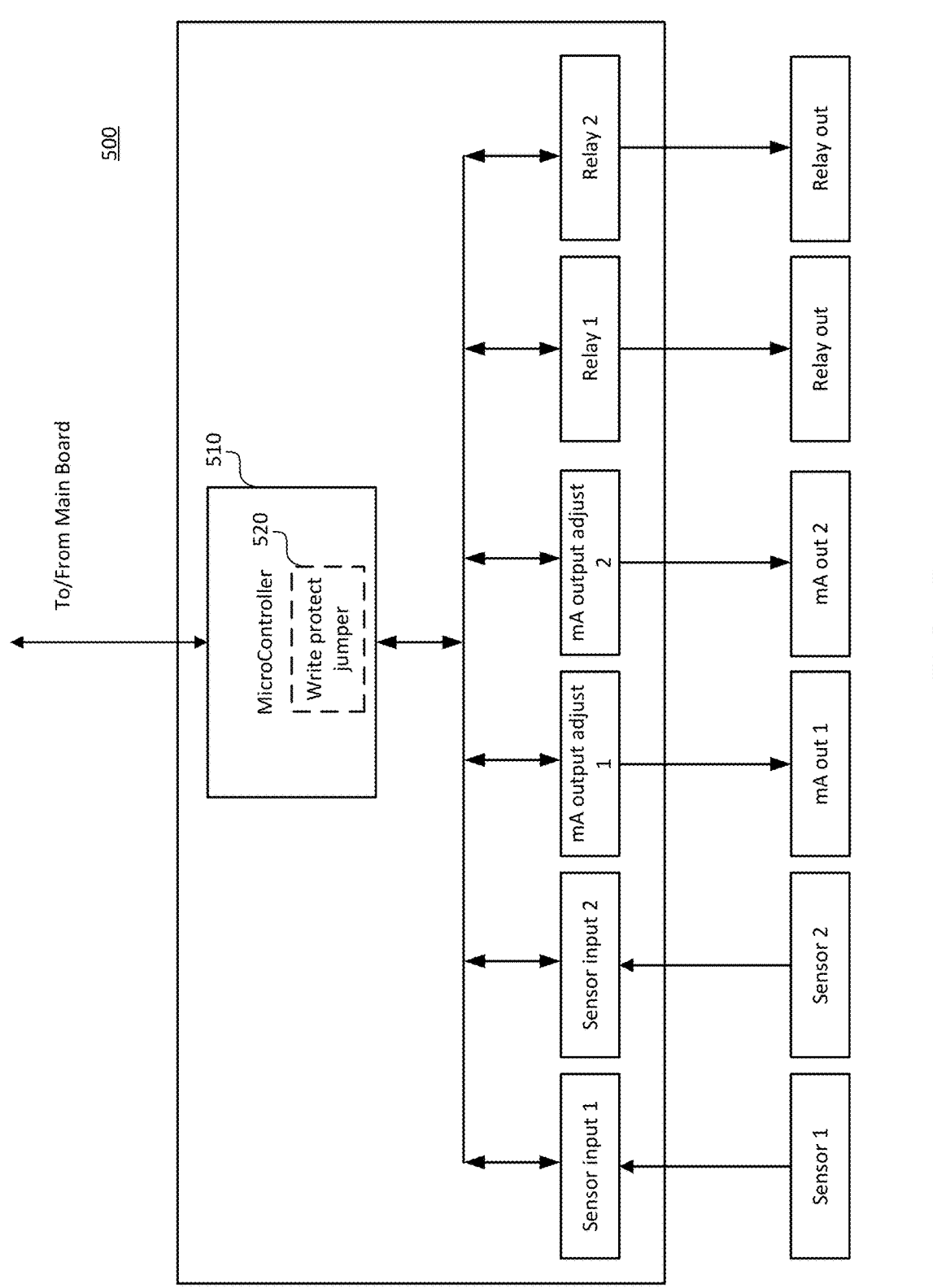
FIG. 5 is an example block diagram of an embodiment of components of a sensor board component for a paperless recording control system according to embodiments of the invention.

FIG. 4 is an example block diagram of a paperless data recorder 400, which may be an embodiment of the paperless recording control systems 102 or 312 above. The system 400, or related systems, may be referred to as a paperless recording control system, a paperless data recorder, a paperless process recorder, a PPR, or a data recorder. In this embodiment, the paperless data recorder 400 is illustrated separately from the sensors or sensor boards, which were described above. Instead, an example sensor board is illustrated in FIG. 5, which may couple to the paperless data recorder 400 of FIG. 4 in the ways described above. The paperless data recorder 400 may communicate to illustrated components depicted in FIGS. 4 and 5 through general purpose I/O interfaces, or using other interfaces and protocols.

In FIG. 4, a main internal processor 410 communicates with an HMI 420. The HMI 420 may further include interfaces such as an LCD 422 and/or touch screen interface 424 to provide a visual representation of data and/or records stored within the paperless data recorder 400. Protocols between these devices and the internal processor may include USB for the touch interface or touch screen, and LVDS for the LCD, for example.

The internal processor 410 is coupled to and manages both internal memory 412 for data storage, as well as access to removable storage 414, as described above. Data from the recorder may be periodically archived by removing the removable storage from the recorder and copying the data to a data archive. Internal memory may store weeks, months, or even years of data from instruments or sensors to which the data recorder is connected.

The internal processor 410 may also be configured to send data from the processor through a data port, such as a USB port 416 or an Ethernet port 418 outside of the paperless data recorder 400. In some embodiments the recorder includes both a USB port 416 and an Ethernet port 418. Still other embodiments may include multiples of either ports 416, 418. The USB port 416 may be used for exporting stored data and charts 430 outside of the paperless data recorder 400. The Ethernet port 418 may also couple the export data for access through a communication network 440. Further, the Ethernet port 418 may serve as a communication portal between a remote user and the paperless data recorder 400, although the communication network 440 need not necessarily use the Ethernet port 418, and may instead be connected to the paperless data recorder 400 through other methods. For example, a remote user may use one or more computer programs 450 to gather data from the paperless data recorder 400 through a communication network or cloud 440. In some embodiments the cloud 440 may be a private communication network, while in other embodiments the cloud 440 may include the Internet. The data between the paperless data recorder 400 and the remote access computer programs 450 may be encrypted for security. Further, the paperless data recorder 400 may receive data, such as annotation or authorization data, from the remote access computer programs 450 through the cloud 440, as described below.

As mentioned above, the paperless data recorder 400 is coupled to one or more sensors or sensor boards. An example sensor board 500 is illustrated in FIG. 5. The sensor board 500 of FIG. 5 operates as described above to receive sensor input and create data from the received input, which is then stored by the paperless data recorder 400. Any of the actual sensors may couple to the sensor board 500 through a wired or wireless communication link. Further, the paperless data recorder 400 may be wirelessly coupled to the sensor board, such as the sensor board 500, or the connection between the data recorder and the sensor board may be a wired connection. In other embodiments, some of the sensors may be coupled to the paperless data recorder 400 through a wireless connection while others may be coupled through a wired connection. The sensor board may also include outputs, in the form of current adjustments in mA, which are sent to other measurement components. Further, the sensor board may control operation of relays, such as Relay 1 and Relay 2, which may be used to control certain devices of the process. The relays may control valves that are used to open, close, or divert flowing liquid in a pasteurization system as described above. The sensor board 500 may also include a microcontroller 510 to control the operation of the sensors and relays, and may also store data from the sensors on the sensor board 500 itself. Further, the sensor board 500 may include a write protect jumper 520, which controls whether and/or which data may be modified depending on the position of the jumper, as described in detail below.

The sensors illustrated in FIG. 5, as well as any sensor to which the paperless data recorder 400 are coupled generate data or data records for storage in the paperless data recorder 400. Specifically, the data may be stored in the internal memory 412, which, as described above, may include the ability to store the sensor data for a very long time, for example one or two years' worth of data, or more. Further, as also described above, the data stored in the paperless data recorder 400 may be separated into 'legal' data, and 'non-legal' data. Legal data describes data generated by the sensors monitoring or controlling a certain process, such as production or pasteurization. Non-legal data is data stored by the paperless data recorder 400 that is not otherwise defined as legal data.

In some embodiments, the internal memory 412 of the paperless data recorder 400 may be segmented so that the legal data is stored separately from non-legal data. In some embodiments the legal data, once stored, may never be modified by any subsequent process, either internal or external to the paperless data recorder 400. In this way, assurance is given that the stored legal data is legitimate data, and was not manipulated or edited in any way. This is possible, in some embodiments, by limiting the process to store the legal data to only the single source of the legal data, i.e., data from the one or more sensors themselves. In other embodiments, data, once stored in the memory 412, may be locked from any subsequent process editing, modifying, or deleting the data.

Data-generating sensors, such as those illustrated in FIG. 5, are typically located near the paperless data recorder 400 itself. As described above, data from those sensors is stored in the paperless data recorder 400. Embodiments of the invention may also store data or information generated that is generated from outside the paperless data recorder 400 or the sensor board 500 described in FIG. 5. With reference back to FIG. 4, external events 460 may be generated from outside the paperless data recorder 400 and sent to the paperless data recorder 400 for storage in the internal memory 412. Data from the external events 460 may be legal data, and stored with the protections for legal data described above, or data from the external events 460 may be non-legal data, and are not subject to data protections. In either case, data from the external events 460 may be received into the paperless data recorder 400 and stored using the same processes described above for data generated within or near the paperless data recorder 400 itself.

Figure 6:
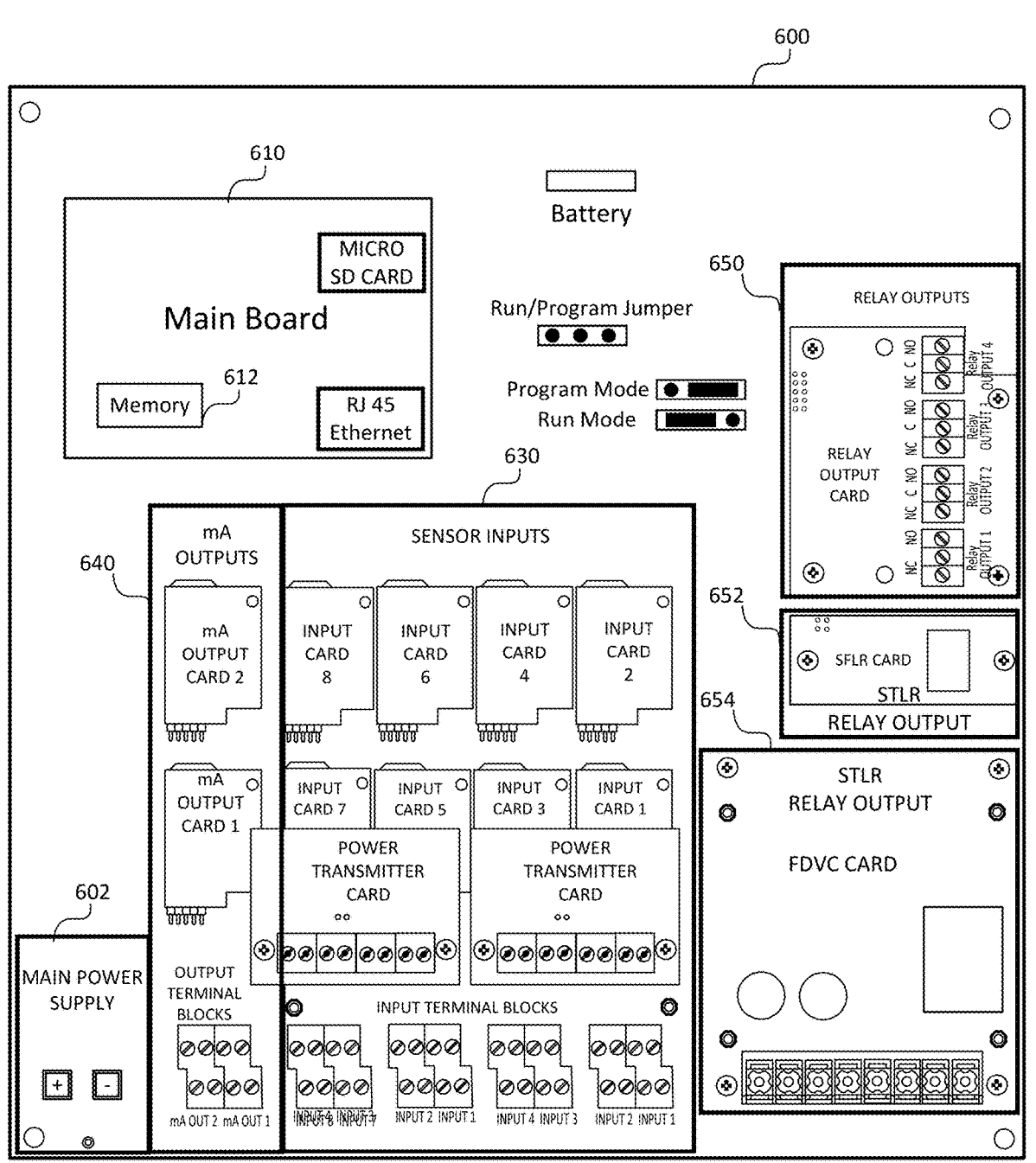
FIG. 6 is a detailed block diagram illustrating various components that can make up a recorder according to embodiments of the invention.

FIG. 6 illustrates example components of a paperless data recorder 600, which may be an embodiment that integrates the paperless data recorder 400 and the sensor board 500 described above. The paperless data recorder 600 includes a power supply 602, which may be used to supply power to the entire paperless data recorder 600, or, in some embodiments, may supply power to only the components of the paperless data recorder 600 necessary to control and record data about the pasteurization process.

Sensor inputs 630 and mA outputs 640 operate as described above with reference to the sensor board 500 of FIG. 5, as well as the general description of these functions described above. Relay outputs 650, 652, and 654 also work as described above, controlling valves and other components of the pasteurization process. Data, including legal as well as non-legal data, from both inside and outside the paperless data recorder 600, is captured and stored by the main board 610 in a memory 612, as both described above as well as below.

As described above, in general, the paperless recording system described herein records and stores process data, creates and allow management of legal records of the stored process data, and provides secure storage of those records so that they may be retrieved and provided to licensing and oversight authorities. Record data may be stored in both raw and graphical form on the paperless data recorder device itself, and also may be exported to one or more remote data networks. As described in detail below, an authorized user may connect another device, such as a computer running certain software, to the remote data network and have real-time access to the data stored by the recording system using a process that keeps data integrity for the system.

In some embodiments, to preserve the integrity of the data stored in the paperless data recorder 600, or any of the systems described above, data from the memory 612 is only exported from the main board 610 in graphic or presentation form, such as in a Portable Document Format (PDF) file or an image file, such as .png or .jpg. For instance, with reference to FIG. 4, a manager with responsibility for multiple operation plants could connect to the paperless data recorder 600 in one of the plants from a remote location, through the communication network 440 (FIG. 4) to retrieve data about a particular process. The data would be retrieved from the internal memory 612, placed or converted to graphical form, and sent to the requester of the data back through the communication network 440. The graphical version is also stored in the internal memory 612 or elsewhere in the system. The manager would then review the graphical representation of the data. It is possible that the manager could annotate or make an approval to the graphical report on their local data access device 450, as described below. Then, data or information about such an annotation or approval is sent back to the paperless data recorder 600. The approval or annotation data is then stored in the memory 612, along with or related to the original data. Then, the next time a manager or qualified person requests the data from the paperless data recorder 600, the original data from the memory 612 may be sent, combined with the newly stored annotation or approval data, again in graphical form. In this way, the paperless data recorder 600 stores a pristine copy of the original data, which is never modified or edited in any way, although the data can be supplemented with annotations or approvals, as described in detail below. Further, the data can be supplemented by events recorded or reported by the external event processor 460 (FIG. 4).

In some embodiments, each graphical version of the data is stored in the paperless data recorder with a unique series number. This series number increments at each data request. Or, an initial graphical version of a set of data, such as v1, may be generated automatically at the expiration of a time period. Then, when a user requests the data, the v1 version of the graphical report is sent to the requester. The system also records who and when the request for data was made. If the user makes an annotation or approval, then data about that event, such as the content of the annotation, as well as its date, time, location, authorized user name, etc. may be stored in the paperless data recorder 600. In a subsequent request for data, the paperless data recorder 600 generates a new graphical version of the data, including all of the original data as well as the annotation/approval data, and produces an updated version of the previous graph. The version number is incremented as well, such as v2. In addition to all of the data about a process being stored in a memory 612, all previous graphical versions of the data may be stored as well. And, in some embodiments, there is no ability for data in the memory 412, 612, to be edited or deleted through any outside connection, such as through the communication network, 440. Instead, data about annotations and/or approvals may be added to the data in the memory 412, 612, but such additions do not delete or modify previous data. References to annotations or approvals, as described herein, means letters, words, characters, numbers, symbols, or a combination of any of such notations. These notations are made in addition to any data or other information originally generated by the data recorder itself, such as data from sensors, timers, clocks, and the like. A memory stores the workflow data record (e.g., the graphical report of a set of data) and the modified workflow data record (e.g., the new graphical version of the data, including all of the original data as well as the annotation/approval data). With such a memory, neither the workflow data record nor the modified workflow data record can be changed, and no portions of the workflow data record or the modified workflow data record can be deleted unless the entire workflow data record and the modified workflow data record are permanently deleted from the data recording device.

In some embodiments, a v1 graphic version of the data is automatically generated at the end of a time period, which may coincide at the end of a production period. Further, as described above, graphic versions of the data may be generated anytime upon request.

Benefits of this combined system include creating audit-ready digital records for internal and regulatory use; streamlined annotation and approval workflow both on-premises and through authorized remote access; digital annotation of the stored record including a list of pre-populated common annotations; data stored in graphical reports as well as raw data form; log files indicating when data was received, reviewed, and/or modified; and secure storage and access of all historical records for authorized users.

Using the hardware illustrated above, or similar hardware in various combinations, the recording system according to embodiments of the invention may perform the following functions:

Record Creation

The recording system records data from the sensors and/or other sources, when the instrument is powered on. This eliminates the possibility of missing or lost data. The data is periodically compiled into a static chart image record, which can be reviewed and approved at the recording device or through the remote data access. The time period of each Record starts at the "Record Start Time" and continues for the "Time Period of Record".

In some embodiments, the records generated by the recording system are static chart images and cannot be dynamically changed or manipulated during review. Users may zoom in and out and pan across the images to review the data, but the data stored in the paperless data recorder is not changed. Record images may be generated in the recording device, even when being annotated or accessed through the remote data connection.

In some embodiments, when the record is created by the recorder as described above, the record will first be produced with the Revision at number 1 displayed on the bottom of the record. Each time the data recorder reproduces an image for the same time period it will automatically increment the revision number displayed on the record to the next whole number. It is typical for the records to be above revision 1 because when they are approved, the data recorder will regenerate the image to include the approval information. Record revisions will also be increased when additional annotations are added to the time period of a record after the first Image was created for that time period.

In one embodiment, the data recorder, such as the paperless data recorder 400 or 600 stores all process data, annotations, approval information based on time stamps at which they were recorded in an internal database on an embedded Multi-Media Controller (eMMC). In some embodiments the data storage scheme in the associated memory is Write Once Read Many (WORM) as the data recorder internal computer that writes this data will not write over data with the same time stamp. The data recorder users cannot access the data recorder internal database through the HMI or other means.

In some embodiments, the data recorder synchronizes its data records through the remote data interface, also referred to as the cloud 440, to a remote data storage, such as in the data access device 450. In some embodiments the recorder 400, 600, synchronizes its data to a remote site, such as the data access device 450 within 15 minutes of record creation, when the network connection is active. In other embodiments the synchronization may occur more or less often, such as every 1-5 minutes, or every 30-120 minutes. The records stored in the remote storage may be read only, and cannot be modified by any user. Additionally, data may be backed up to the removable storage device.

For redundancy, the data recorder 400, 600, creates and maintains a copy of the latest revision of Record images on a removable storage device 414. In addition to the latest revision of record images, for applications with a Record Period that exceeds 24 hours, a daily chart is created by the data recorder and backed up to the removable storage device every 24 hours.

A microSD card located on the main board (FIG. 6) may be used for the removable storage 414. This removable storage 414 may be temporarily removed from the data recorder 400, allowing files to be transferred to a PC or elsewhere. In some embodiments these redundant files are completely separate from, and cannot be integrated with the data stored on the remote data storage described above.

The embodiment illustrated in FIG. 6 includes a Run/Program Jumper, which may be located on the data recorder motherboard. This jumper has two positions, with a jumper covering either the center pin and a left pin in a "Run" mode, or covering the center pin and a right pin in a "Program" mode. Sealing Covers and Health Authority Seals, described below, can be used to ensure the Run/Program Jumper position changes are tamper evident, by placing a sealing cover over the jumper after it is set. Thus, the jumper mode pin may be made tamper proof. Additionally, the data recorder 600 electronically records all changes of the Jumper pin position in the system activity log.

The jumper in the Run Mode may disable certain inputs or functions. In one embodiment, the jumper in Run mode disables the ability to configure sensor inputs, such as inputs 1-4. It also disallows changes to a Configure Recorder (including STLR & SFLR Setpoints). It disables Input Calibration. It disables software updates. The STLR Relay Output can be active only if other conditions are met.

The jumper in the Program Mode results in the following conditions: Input 1-4 configuration is enabled; Changes in Configure Recorder enabled (including STLR & SFLR Setpoints); Input Calibration is enabled; Software updates are enabled; STLR Relay Output is inactive.

In some embodiments, the position of the jumper does not affect or inhibit the following: the data recorder's ability to record data or create records; Annotations; Network Configuration; Output Configuration; Process Alarm Configuration (Independent of STLR & SFLR Alarms; System Info/Annotation Configuration; User Password Management;

Any or all of the boards illustrated in FIG. 6, including the jumper pin, may be covered with sealing covers to prevent damage from wet and dirty environments. Further, any or all of the boards may be covered with tamper-evident seals to prevent unauthorized users from accessing the wiring or other components on the boards. Tamper evident protection may include sealing covers, and/or wire lockable screws, for example, that provide a visual indication when the screw has been tampered with or removed. Other forms of tamper protection may also be used.

Also, certain of the physical boards themselves, such as those illustrated in FIG. 6, may be separated so that some of the boards allow physical access while other of the boards are protected by the tamper-evident protection described above. Yet further, the tamper evident protection may cover a part or portion of a particular board, while allowing other parts or portions of the same board to be freely accessed. In yet other embodiments, such tamper-evident protection may include combinations of all of the protection and tamper-evident protection scenarios described above. For example, tamper-evident protection may protect the components of the data recorder 600 related to legal data storage, while not protecting those components of the recorder 600 that are not related to legal data storage.

Some embodiments, like the one illustrated in FIG. 6, include hardware support for a Safety Thermal Limit Recorder (STLR). The STLR version of the data recorder provides functions associated with recording and controlling a continuous pasteurization process. Including recording pasteurized product temperature, controlling/signaling the flow diversion valve (FDV.) and recording the Flow Diversion Valve position. Addition features allow for multiple diversion set-points, recording active setpoint, and recording peripheral pasteurization process such as cold product recording. STLR set-points provide up to 15 user selectable STLR Diversion Setpoints (STLR SP), the setpoint is equivalent to the cut-out temperature. Diversion set point values can only be changed when the run/program jumper is in Program position. In addition to restricting access to the Run/Program shunt jumper, the Sealing Covers prevent modifications to circuit boards and input/output wiring connections.

The data recorder provides fail-safe operation via internal self-diagnostics of the STLR Input signals. The Primary RTD input signal (STLR Input 1) is continually referenced against the Secondary RTD signal (STLR Input 2). The difference between the calibrated measured inputs is indicated on the home screen of the data recorder as the Sensor Imbalance. If the imbalance is greater than 1° C. or 2° F. the system will record a sensor imbalance in the system activity log and display a warning message on the data recorder HMI. If STLR Input 1 or STLR Input 2 measure a short or open circuit the STLR Relay output will be inactivated causing the system to divert. The STLR Relay output will remain inactive until the measured values are back in the expected range.

Relay outputs may be assigned to process alarms. The mA outputs may be assigned to any analog input value.

After the recorder 600 has been properly installed and set up, it may be configured such as configuring the date/time, network configurations, configuration of inputs and outputs, configuration of recorder options, configure system information and annotation, and configuring alarms.

Figure 7:
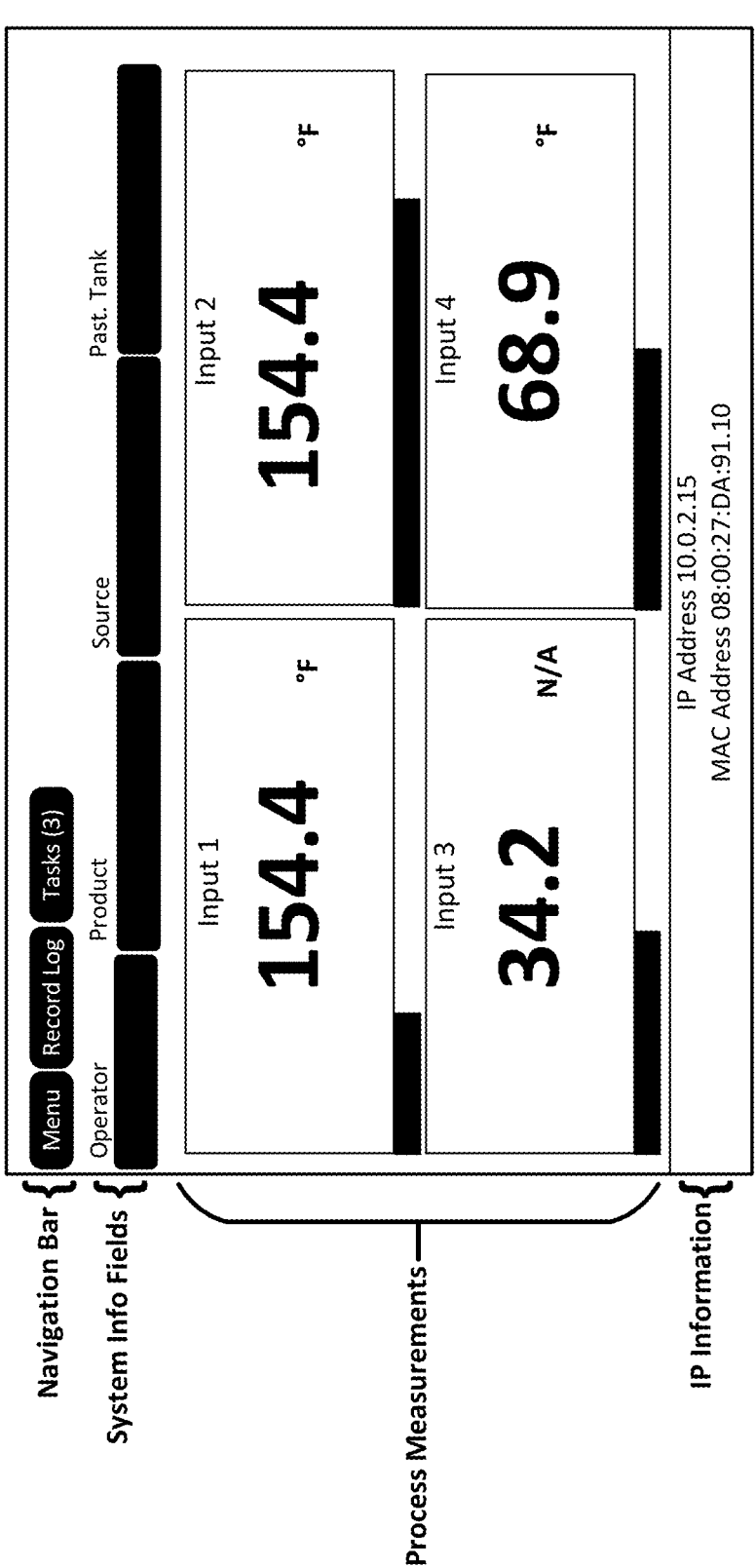
FIG. 7 illustrates an example output that may be presented on the HMI or touchscreen of the recorder.

FIG. 7 illustrates an example output that may be presented on the HMI 420 (FIG. 4) or touchscreen of the recorder, or on an output connected to the paperless data recorder 600. The example home screen of FIG. 7 includes 4 main sections of information: Navigation Bar, System Info Fields, Process Measurements and IP information.

The navigation bar allows the user to easily select a particular screen by selecting the desired screen. The system information fields allow the user to quickly add annotations to the data recorder record in real time. The System Info Name for each System Info field and the items that appear in the drop-down list are fully configurable on the data recorder.

The operator field allows an operator to sign-in or sign-out of the overall system. In some embodiments, signing in or changing the operator requires authentication and creates an annotation on the record. The last authenticated user is displayed in this field in the example home screen. The product field is used to identify the particular product that the recorder is recording information about.

The process measurements section of the home screen is divided into sections depending on the number of available Inputs. FIG. 7 illustrates an example four-input data recorder home screen where the process measurement section is divided into 4 equal quadrants. Each quadrant is automatically associated with a data recorder input channel. The data recorder will continuously update the numerical process measurement values on the home screen as well as a bar graph indicating the current value with reference to the input range. Each input may be configured for the application to ensure that the data displayed in the Process Measurement fields are scaled correctly.

Figure 8:
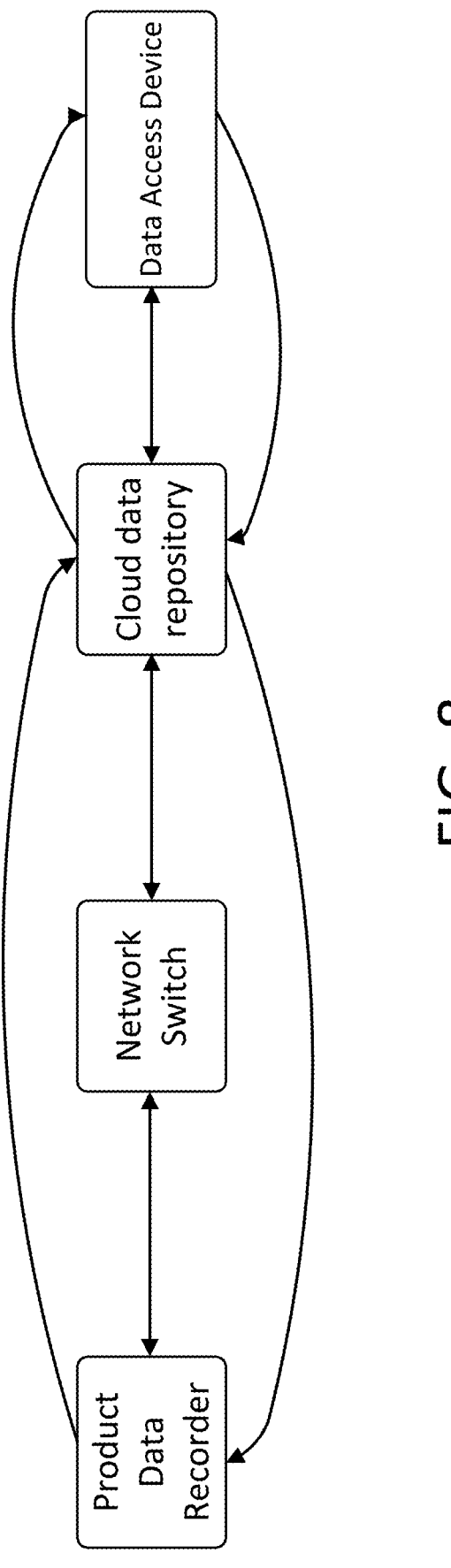
FIG. 8 is a diagram of an example network to which the product data recorder may be coupled.

FIG. 8 is a diagram of an example network to which the product data recorder, such as the recorders 400, 600, may be coupled. In general, the product data recorder 400, 600, couples to a cloud data repository as illustrated in both FIGS. 8 and 4. In some embodiments, the data recorder may couple to the cloud data repository through a network switch, such as a switch used to connect other parts of an office building or production plant to the internet. In other embodiments the data network may be a private network. The cloud data repository may be accessed by a data access device. In some embodiments the data access device is a computer that runs appropriate software that can connect to the cloud data repository. In some embodiments the data access device is a web-based internet device, such as a computer running a web browser, or other software that allows an authorized user to connect to data in the cloud data repository. In operation, the product data recorder sends data to the cloud data repository at regular intervals. The product data recorder may send the data in raw form, or in record form, as described below. Then, a user of the data access device, which may be a long distance away from the product data recorder itself, may couple to the cloud data repository to view the data records.

In addition to viewing the records, one of the main functions of the systems according to embodiments of the invention provide is that the system allows for records to be created, maintained, reviewed, approved, and authorized either at the recorder device 400, 600, which is typically located very near the equipment that is being monitored by the recorder device, or through remote access of the recorded data.

Figure 9:
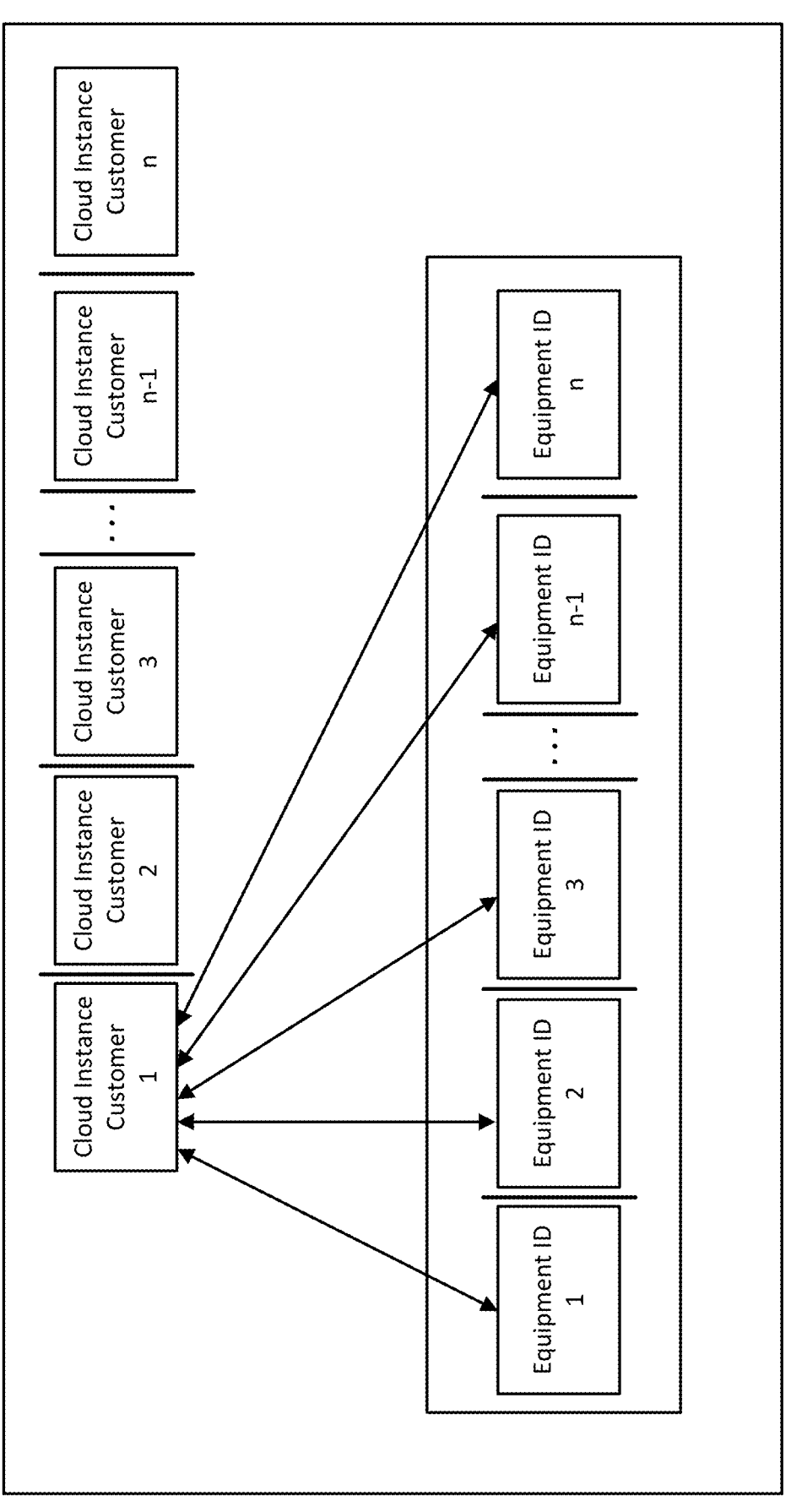
FIG. 9 illustrates how data for different producers and for different equipment operated by each producer, or customer, is kept separate.

FIG. 9 illustrates how data for different producers and for different equipment operated by each producer, or customer, is kept separate. Each piece of data recording equipment from a single operator is uniquely identified by a key, such as an API key. In other words, each data recorder 400, 600, of a producer communicates to the data cloud using a unique key. Then, each customer or producer is kept separate from one another in the data cloud through independent instances of the data management software. Users are credentialed through identification and passwords so that they may gain access to only their own data. Further, there may be different levels of access so that only certain users are able to annotate or approve certain data records. For example, some users may be able to view data provided by the data recorder 400, 600, while other users are able to make annotations to the data, described below, while still others are able to record process approvals to the data.

Figure 10:
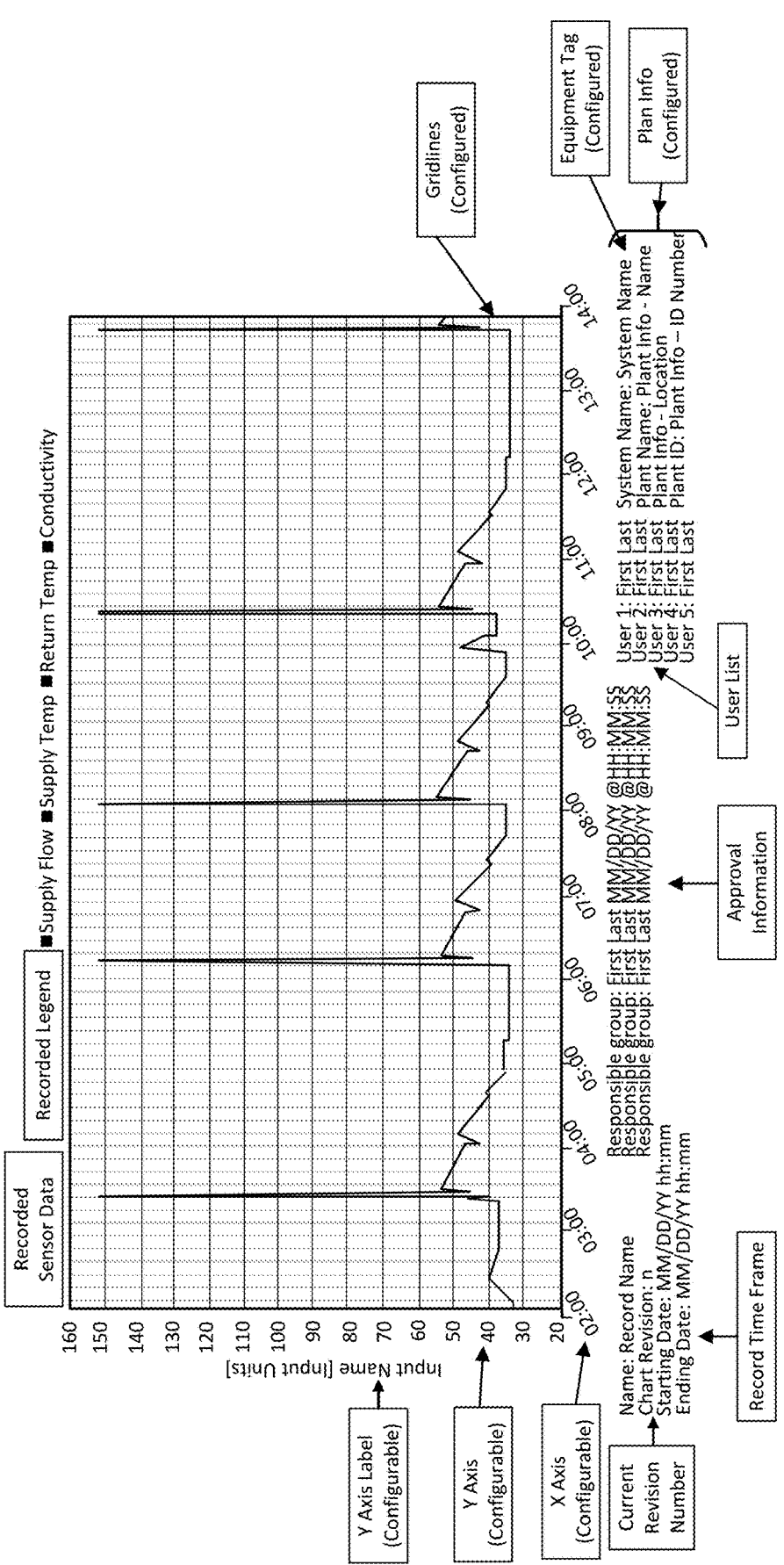
FIG. 10 is an example of a data record produced in graphical form by the recorder.

FIG. 10 is an example of a data record produced in graphical form by the recorder. The records created by the data recorder are highly configurable and can be customized by a user who sets up the recorder to compile all the required information that may be required to prove a process was done into a single record image. Data in graphical form may be stored in the memory 412, 612, respectively of a paperless data recorder 400, 600. Or, graphical form data may be created 'on the fly', from data stored in the memory 412, 612, as it is requested.

Comments elements of records include a legend, or name, which is automatically displayed above the chart area with all recorded data trendlines and colors. Also, recorded sensor data may be placed on a record, with all sensors producing data to be stored and associated with a record. As described above, records may be time-based, i.e., all recorded sensor data from a particular time period is stored in one or more related records. Particular events, either internal to a paperless data recorder 400, 600, or external from an external event generator 460 may further be stored in the record.

Further, in a data record, the Y and Y access may be configured and named. A revision number is automatically incremented by the data recorder each time the Recorder generates a new Record. Further, the time frame, or time period that represented in the record is configurable and described in the record.

Approvals, which are described below, are automatically added by the data recorder when the Record is approved through the data recorder or remote data storage. Some embodiments may be configured to have multiple-stage approvals, such as 1, 2, or 3-stage (or more) approvals. Each approval means someone with appropriate authority has approved the process or data up to the point of approval. In some embodiments, approvals are added to the record only after the each stage of the approval has been completed. Further, a record may be configured to reflect a name of a responsible group that is responsible for each stage of the review. If two approvals from same responsible group are present, the newer approval is shown on the data recorder Record. The record may include a user list, which automatically adds names to the Record as each of the users logs into the data recorder or into a remote data access program. Further configurable information on a record can include plant information, a system Name, and whether or not gridlines are used in the record, as well gridline configuration data.

Viewing the Data Recorder Record Annotations

Figure 11:
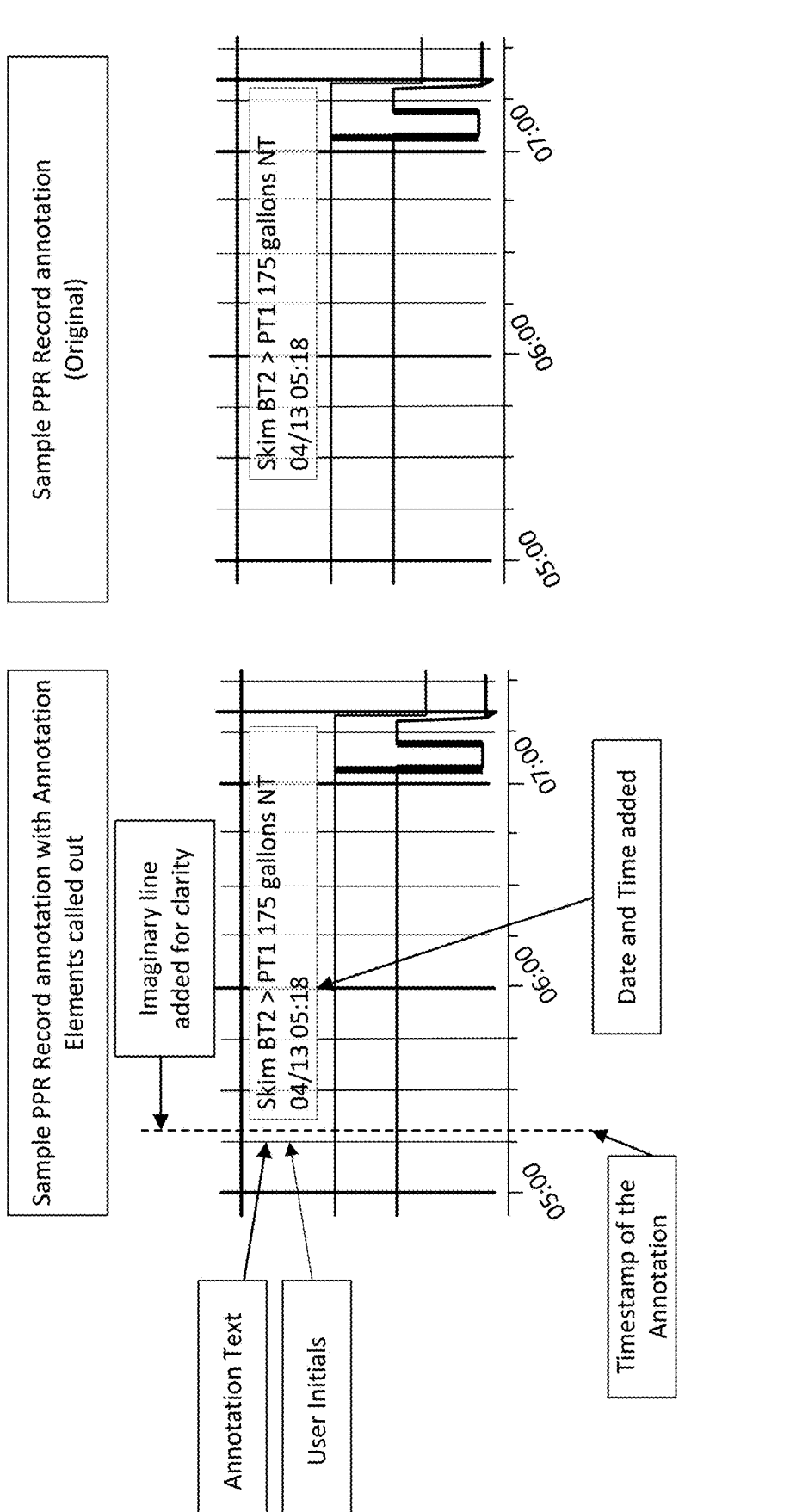
FIG. 11 is an illustration of an annotation made to a record.

FIG. 11 illustrates additional details of an annotation to a record. An annotation is made when someone who has sufficient qualifications logs into either the data recorder 400, 600, or logs into data access device 450 (FIG. 4) to view a record from the data recorder. The authorized user may make annotations to the Record, which annotations then become part of the record itself, so that, when the record is next requested, the annotations and/or annotation data may also be sent with the record or record data.

There are multiple elements to each annotation that appears on a the data recorder Record. Elements may include, for example, user initials of the authenticated user who added the annotation. Generic initials, such as "PPR", or other pre-configured initials may indicate that a particular annotation is generated by the paperless data recorder itself. The annotation will include a timestamp, which records the time the annotation was made. The time and data the annotation is added also becomes part of the record. Annotations added through the System information workflow are preferably added to the data recorder record in real time. In some embodiments, annotations added through the remote data access are added to previously recorded data. Then the annotation data is stored along with or related to the Record to which it was made. Then, the next time the record data is requested, the original data plus the annotation data is presented to the requester.

Figure 12:
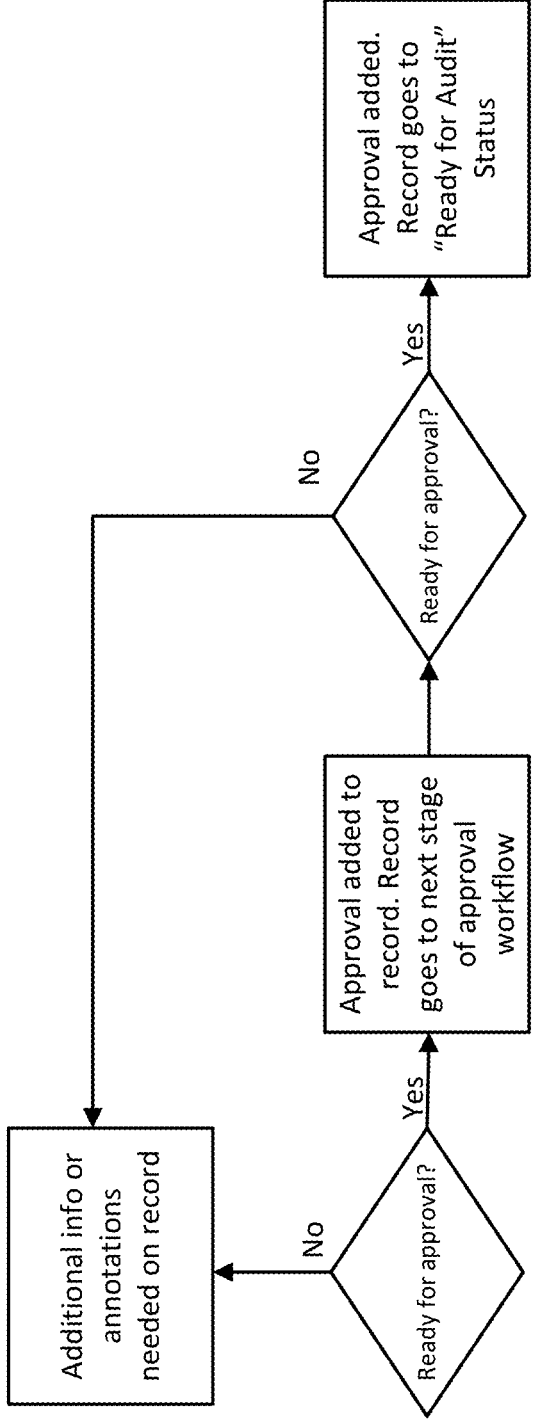
FIG. 12 illustrates an example record approval workflow according to embodiments of the invention.

FIG. 12 is an example flow diagram illustrating example operations of how to make an annotation in a record. The annotation may be made through the recorder hardware itself, or may be made by accessing the data from the recorder through a remote data access, as described herein. In this example chart of FIG. 11 elements are as follows; Users Initials=NT; Timestamp of the Annotation=05:16;

Date and Time added=April 13th at 05:18; Annotation Text=Skim BT2>PT1 175 gallons.

FIG. 12 illustrates an example record approval workflow according to embodiments of the invention. Following the record creation detailed above, most customers use the data recorder HMI or remote data access software 450 to review and approve the records that have been created with authenticated users. The Approval workflow is configurable, and may include the number of approval stages expected for each data record, responsible parties for the approval at each stage and the allowable timeframe for each approval stage. The approval workflow may be configured at the equipment level, thus all the data recorder records from the same the data recorder may have the same approval workflow. Typical approval workflows are between one and three stages. FIG. 12 shows an example of a two-stage approval process.

In general, approval and authorization may be performed on either or both of the data recorder 400, 600 and/or through the remote data connection 450. In a primary use, the data recorder 400, 600 receives sensor and other data and makes a digital record in the form of a graphic to present the data. This graphical record of the data is stored in its internal memory and, as described above, the data may not be changed once recorded, although annotations may be made to the data. The data and/or the graphical representation of the data from the recorder 400, 600 are loaded to the remote data cloud storage 440, which may be accessed by authorized users through a device 450 different than the recorder itself. Then, an authorized user may review and approve a pasteurization cycle, for instance, or other procedure that requires approval. If the approval is performed through the remote data access 450, the approval is forwarded back to the data recorder itself 400, 600. Then, approval data is made part of the graphical representation of the original data, and the approval data becomes part of the stored record. Alternatively, the approval process may be completed by an authorized user on the data recorder 400, 600 itself. In this latter case, the approval would also be uploaded to the recorder and stored in the graphical record, in addition to the data and/or data record. Then, the updated record is stored in the internal memory 412, 612 of the data recorder 400, 600, respectively, and may also be uploaded to the remote data cloud storage 440. Note that, in such a system, even an authorized user is not able to modify the data stored in the data recorder 400, 600. Instead, the authorized user may annotate or create a data record in addition to the originally stored data.

In some cases, the customer may not have an internet or other data connection, or may not wish to use the connection. In this case, the data recorder 400, 600, could be used as a stand-alone, local, device, and the process may be reviewed and approved at the local level. In this embodiment an authorized user logs into the data recorder 400, 600 itself, through the HMI 420. In other cases the data recorder 400, 600 may be connected to the internet or remote cloud 440, and the authorizing personnel is located off-site, and not at the same location as the data recorder. In this instance, the authorized user may review and approve the process remotely through the data access device 450. An annotation is created and stored with the original data record, which is not modified during the annotation or approval process. As described above, the annotation may include a text message and a time stamp related to the exact point in the process time that the annotation was made. After creation, the annotation is saved and can be reviewed at both the data recorder 400, 600 and through the remote data connection 450.

In all of these cases the data recorder creates records that contain all of the data and authorizations necessary to be made so that such records may be reviewed by reviewing authorities.

Figure 13:
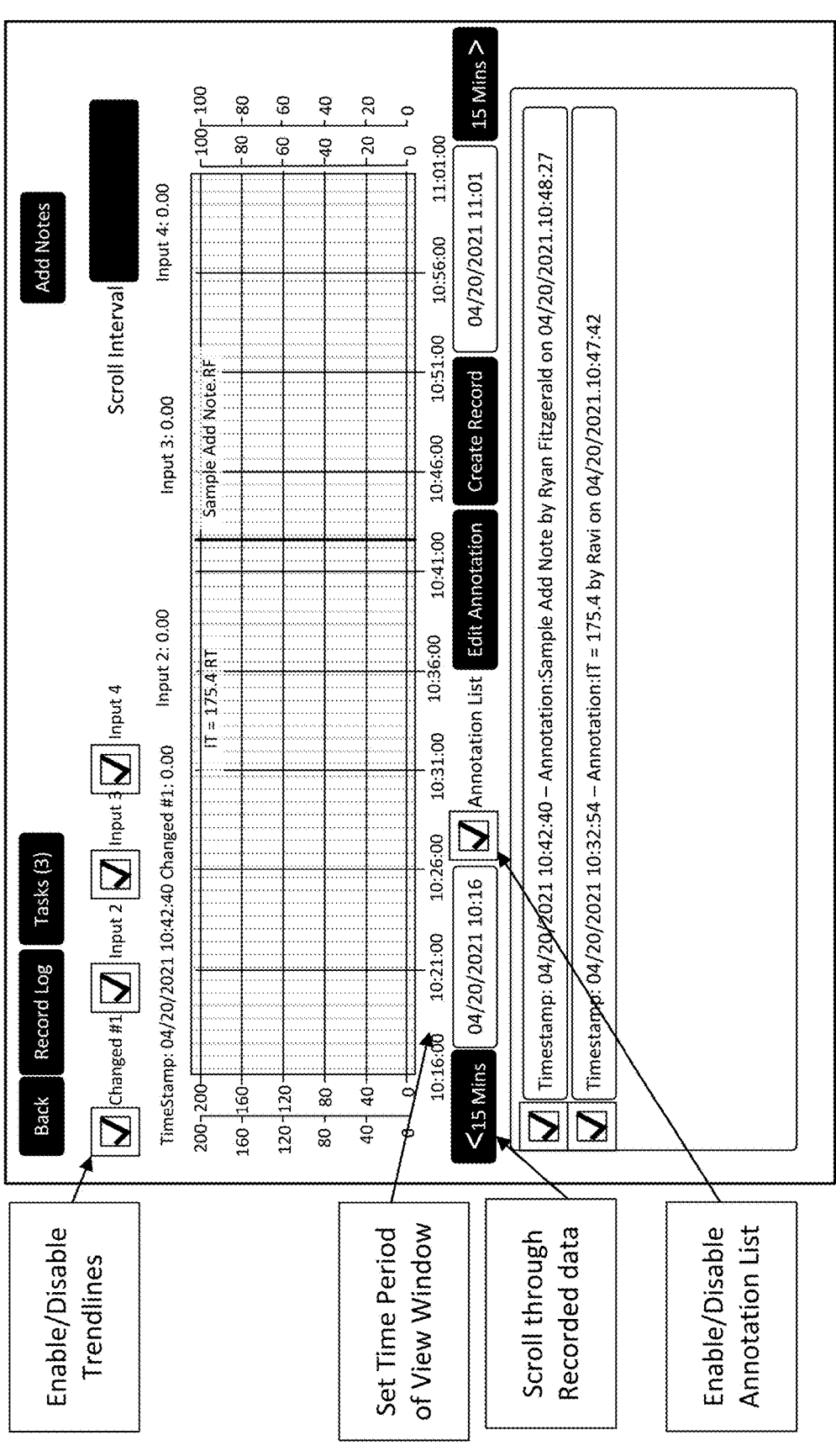
FIGS. 13 is an example screen shot of one or more data record and illustrates how a record of previously recorded data is viewed either on the recorder, on the remote data record, or on both the recorder and the remote data record.

FIG. 13 is an example screen shot of one or more data record and illustrates how a record of previously recorded data is viewed either on the recorder, on the remote data record, or on both the recorder and the remote data record.

For example a user may configure whether to enable or disable trendlines on a particular record. Further, the time period of the record displayed may be configured on this screen. The tart and end date fields allow a user to set the time period of view window. Either of these two fields on the left and right of the chart allow a user to set a precise time for the beginning and end of the view chart period. A scroll interval may also be selected, as well as buttons that allow a time record to be scrolled both forward in time and backward in time. A cursor position within the time chart may be changed by the user by touching any part of the chart to change the cursor position.

An add notes allows the user to create an annotation at the current cursor position, as described above. Also, an annotation list checkbox may be controlled by the user. Selecting the annotation list will enable (show) the annotation list as seen in FIG. 13 and deselecting will disable (hide) the annotation list.

Embodiments of the invention automatically record changes in, or the occurrence of the following events in the system activity log: Configuration; Calibration; Software Updates; Run/Configure jumper position; Power on & off events; System Time; Input errors and failures; Detection of Removable storage device. These events cannot be manually added or removed from the System Activity Log.

When Viewing the System Activity Log, a user can apply filters to look for specific events, such as by searching for specific Event Types, Event Descriptions, and events that occurred during a particular time.

Adding Annotations

Annotations can be added to a record through two different workflows; 1) System Information annotations or 2) Add Notes annotations. Both workflows require valid user credentials before the annotation information is added to the data recorder memory and the Record. Once an annotation is added to the data recorder 400, 600, it can always be viewed on the View Chart screen, which is produced from data stored on the data recorder. If the annotation is later edited, only the updated annotation appears on the data recorder record.

For system information annotations, this workflow is designed to enable the user to quickly add information to a real time datapoint from the home screen. This workflow is typically used to indicate changes in the system or process information such as the change in product, source tank, or batch number. In some embodiments, a pre-configured annotation may be selected from a dropdown list.

Annotations may also be made from a view chart screen. This workflow is commonly used to annotate information that happened in the past such as product changes, wash cycles and unexpected events.

Figure 14:
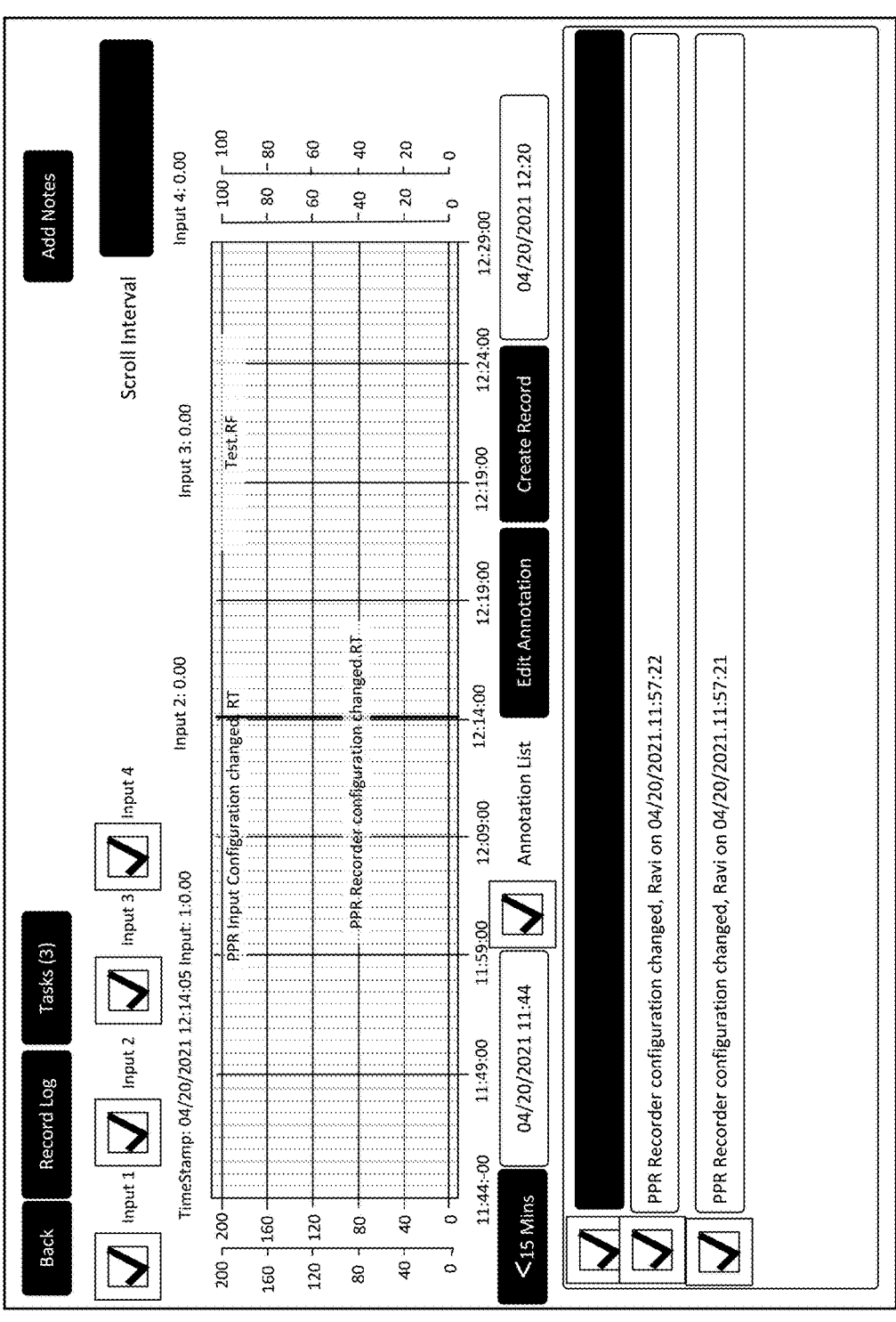
FIG. 14 illustrates how an annotation may be edited after they have been created.

FIG. 14 illustrates how an annotation may be edited after they have been created. Authorized users of the data recorder 400, 600 can edit or update any annotation created through the Add Notes or System Information Annotation workflows after they are added to the record with the Edit Annotation workflow. When annotations are edited, the original annotation will be deselected (hidden) on the Annotations list of the View Chart screen. The original annotation is not displayed on the data recorder Records, the updated/edited annotation is displayed on the data recorder record.

With reference to FIG. 14, to edit an annotation, first "view Chart" is selected in the home screen to select a chart that has the annotation that is being edited. Then, an annotation list is selected to show the list of annotations available to be annotated. In FIG. 14, there are three annotations that may be edited. Next, the user selects the annotation to edit. In FIG. 14, the selected annotation is highlighted. Assuming valid credentials are entered, either the text of the annotation may be edited, or the cursor position of the annotation may be edited.

Figure 15:
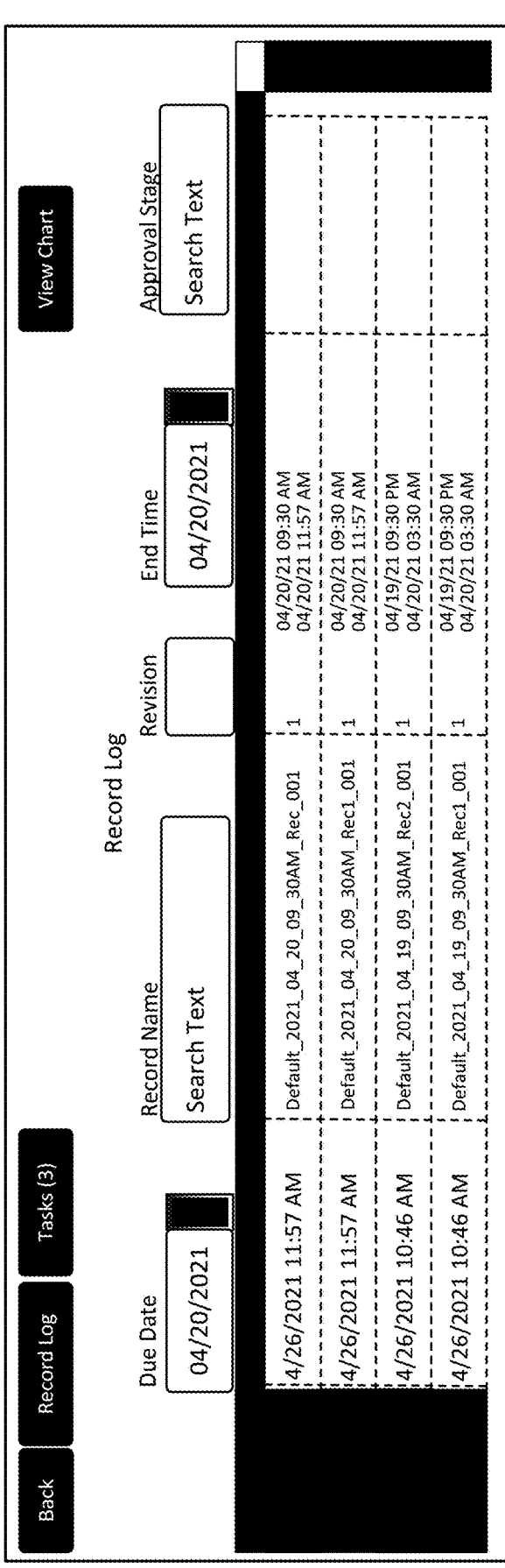
FIG. 15 illustrates how records may be reviewed.

FIG. 15 illustrates how records may be reviewed. Selecting the "chart" button shows the recorded data contents in list or record form, while selecting "image" illustrates the selected record in a graphic form.

Figure 16:
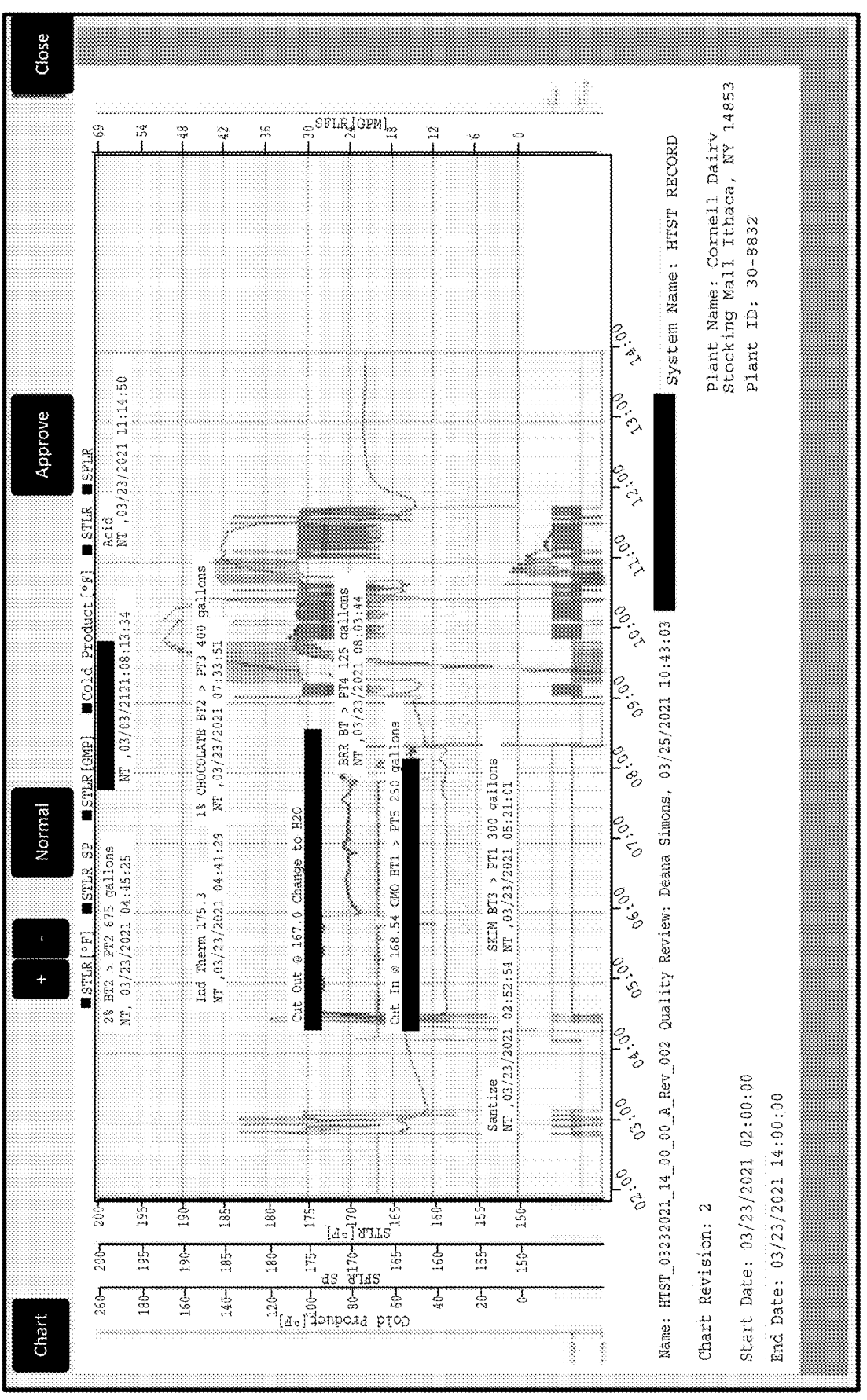
FIG. 16 illustrates how a record may be approved by a supervisor, or someone having authorized credentials.

FIG. 16 illustrates how a record may be approved by a supervisor, or someone having authorized credentials. Approvals are similar to authorizations, in that, a user having the requisite level of credentials can 'approve' a process, or part of a process, by making an approval annotation on a record.

The data recorder 400, 600 allows for complete record review and approval through the HMI, thus the approval work-flow can continue through the data recorder even if there is a temporary disconnection to the remote Cloud Server 440 that inhibits records from being approved in the cloud. In some embodiments, only static chart images found in the Record Log can be approved, and there is no approval workflow for the View Chart screen. In one example, to approve a record through the data recorder HMI, the following operations are performed. First, the user presses Record Log in the top left corner of the home screen (FIG. 7). Next, on the Right side of the Record Log, the Approved Stage column is inspected (FIG. 15). If approval is added to a record that already contains an approval, a new revision of the record will be created and the latest approver name time and date stamp will appear on the record. The user then selects the desired record in the Record Log list view, and presses on the Image button on the Left side of record log. The data recorder 400, 600 will display the latest revision of the record image for that time period including all data trendlines, annotations, approvals, etc. Then, a screen will appear like the one shown in FIG. 16.

In general, approving a record will increase the record revision, add responsible group of the approver, add the approver's name, and time and date of approval to the record.

In this way, processes including data recorded by sensors of a paperless data recorder 400, 600 may be inspected and approved by an authorized user at a location remote from the recorder itself. The data is protected at the paperless data recorder 400, 600 because the raw data from the paperless data recorder is never modified in the approval process or anytime the data is retrieved from the paperless data recorder. Instead, the data from the paperless data recorder 400, 600 is first generated by the paperless data recorder and then presented in graphical form. Then, any annotations or approvals are added to the data stored in the paperless data recorder 400, 600. In some embodiments, the paperless data recorder 400, 600 automatically adds data from the annotations and/or approvals to the record, and automatically generates an updated graphical representation of the data, which is then stored in the paperless data recorder.

As described above, embodiments of the invention may take a variety of physical forms to support the various functions described herein.

Computer storage media, or any other media described herein, includes volatile and nonvolatile, removable and non-removable media implemented in any method or technology for storage of information such as computer-readable instructions, data structures, program modules, software, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computing device. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory includes computer storage media in the form of volatile and/or nonvolatile memory. Memory can include instructions, which, when executed by a processor are configured to cause a computing device to perform any of the operations described herein, in reference to the above discussed figures, or to implement any program modules or components described herein. The memory may be removable, non-removable, or a combination thereof. Illustrative hardware devices include solid-state memory, hard drives, optical-disc drives, etc. Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Communication between any of the components described herein may be made through physically connected wires or wirelessly. Wireless communication may be unidirectional or bi-directional. In some systems where data integrity is required, a data sending device may only include a transmitter while a data receiving device only include a receiver. In other embodiments each of the data sending device and data receiving device includes both a transmitter and a receiver.

It will be understood that certain features and sub-combinations are of utility and may be employed without reference to other features or sub-combinations. This is contemplated by and is within the scope of the claims.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

What is claimed is:

1. A method of generating a notation in a workflow having one or more data records of a data recording device, the method comprising:

generating a workflow data record by recording data from a first sensor and a second sensor each coupled to the data recording device, the workflow data record including an indication of whether the workflow has been completed based at least in part on a combination of measurements from the first sensor and the second sensor;

receiving a request to review the one or more data records from a requester;

creating an image representation of the one or more requested data records without modifying the recorded data from the first sensor and the second sensor;

providing the image representation of the one or more data records to the requester;

receiving at the data recording device the workflow notation about the one or more data records;

generating a revised image data record at the data recording device from the original one or more data records and the workflow notation, wherein the revised image data record includes the recorded data without modification and without deletions of the recorded data; and storing the revised image data record in association with the one or more data records, wherein neither the image representation of the one or more requested data records nor the revised image data record can be changed, and wherein portions of the image representation of the one or more data records and the revised image data record are only capable of being deleted when the entire one or more requested data records and the revised image data record are permanently deleted.

2. The method according to claim 1, in which the image representation of the one or more requested data records is one or more graphical representations of the one or more requested data records.

3. The method according to claim 2, in which creating an image representation of the one or more requested data records comprises creating a graphical version of the revised data record.

4. The method according to claim 2, further comprising storing all graphical versions created by the data recording device.

5. The method according to claim 1, in which the notation is an annotation or an approval.

6. The method according to claim 1, in which the revised image data record includes information from the one or more data records and at least a timestamp of a time the notation was made and an identification of the requester.

7. The method according to claim 1, further comprising preventing deletion or changing of the one or more requested data records until a time that the one or more requested data records are permanently removed from the data recording device.

8. The method according to claim 1, in which receiving the request comprises receiving a request from an authorized user over a remote connection or at the data recording device itself.

9. The method according to claim 1, in which the workflow data record is stored in a memory of the data recording device.

10. The method according to claim 1, in which the workflow data record is stored in a data store in a repository remote from the data recording device.

11. The method according to claim 1, further comprising relating the revised image data record to data previously stored in the data recording device.

12. The method according to claim 1, further comprising generating at least a part of the workflow data record at the data recording device from information from an event that is external to the data recording device.

13. The method according to claim 1, in which generating the revised image data record comprises generating a graphical version of the revised data record.

14. A data recording device coupled to a first sensor and a second sensor that record data about a workflow, the data recording device comprising:

a workflow data generator configured to generate a workflow data record from the data of the first sensor and the second sensor, the workflow data record including an indication of whether the workflow has been completed based at least in part on a combination of data from the first sensor and the second sensor;

a receiver structured to receive a request to review the workflow data record from a requester;

a data replicator structure to create an image representation of the workflow data record without modifying the data of the first sensor and the second sensor;

a transmitter structured to send the image representation of the workflow data record to the requester;

the receiver further structured to receive a notation based on the image representation of the workflow data record;

the workflow data generator further configured to:

generate a new data record from the workflow data record and the notation as an image having a unique version number, wherein the new data record includes the workflow data record without modification and without deletions of the workflow data record, and store the new data record in association with the workflow
data record as a modified workflow data record; and a memory to store the workflow data record image
representation and the modified workflow data record,
in which neither the workflow data record image representation nor the new data record can be changed, and
in which portions of the workflow data record and the
modified workflow data record are only capable of
being deleted when the entire workflow data record and
the modified workflow data record are permanently
deleted from the data recording device.

15. The data recording device according to claim 14, in
which the data replicator is structured to generate a graphical
representation of the workflow data record.

16. The data recording device according to claim 14, in
which, the receiver is structured to receive a subsequent
request to review the workflow data record, and, in response,
the data replicator is structured to create a representation of
the modified workflow data record.

17. The data recording device according to claim 14, in
which the data recording device is configured to verify an
identity of the requester.

18. The data recording device according to claim 14, in
which the receiver is structured to receive the request from
the requester at the data recording device itself, or through
a communication gateway from a remote location.

19. The data recording device according to claim 14, in
which the notation is an annotation made to the workflow
data record or an approval of the workflow data record.

* * * * *